United States Patent
Omata et al.

(10) Patent No.: US 12,002,141 B2
(45) Date of Patent: Jun. 4, 2024

(54) IMAGE DISPLAY APPARATUS

(71) Applicant: SONY GROUP CORPORATION, Tokyo (JP)

(72) Inventors: Takanobu Omata, Tokyo (JP); Kaoru Koike, Tokyo (JP); Yuichi Miyagawa, Tokyo (JP); Hisataka Izawa, Tokyo (JP); Itaru Shimizu, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/766,816

(22) PCT Filed: Jul. 21, 2020

(86) PCT No.: PCT/JP2020/028273
§ 371 (c)(1),
(2) Date: Apr. 6, 2022

(87) PCT Pub. No.: WO2021/075118
PCT Pub. Date: Apr. 22, 2021

(65) Prior Publication Data
US 2024/0087205 A1    Mar. 14, 2024

(30) Foreign Application Priority Data
Oct. 15, 2019   (JP) ................................. 2019-188504

(51) Int. Cl.
*G06T 15/00*    (2011.01)
*G06F 3/01*    (2006.01)
(Continued)

(52) U.S. Cl.
CPC .............. *G06T 15/00* (2013.01); *G06F 3/013* (2013.01); *G06F 3/0488* (2013.01); *G06F 3/14* (2013.01); *G06T 7/70* (2017.01)

(58) Field of Classification Search
CPC ....................................................... G06T 15/00
See application file for complete search history.

(56) References Cited

U.S. PATENT DOCUMENTS

| | | | |
|---|---|---|---|
| 2008/0043014 A1 | 2/2008 | Tachi et al. | |
| 2015/0355471 A1* | 12/2015 | Yoneno | G02B 5/13 |
| | | | 348/51 |

(Continued)

FOREIGN PATENT DOCUMENTS

| | | |
|---|---|---|
| JP | H09238369 A | 9/1997 |
| JP | 2013-105084 | 5/2003 |

(Continued)

OTHER PUBLICATIONS

International Search Report and Written Opinion prepared by the Japan Patent Office dated Oct. 20, 2020, for International Application No. PCT/JP2020/028273, 3 pgs.

(Continued)

*Primary Examiner* — Shivang I Patel
(74) *Attorney, Agent, or Firm* — Sheridan Ross PC

(57) ABSTRACT

There is provided an image display apparatus that makes it possible to automatically orient a front face of a three-dimensional object represented by a three-dimensional image to a user. There are provided: a display unit that displays the three-dimensional image, by which the three-dimensional object appears to exist in a space partitioned by members configuring an outer surface, to be visually recognizable from a plurality of circumferential directions; a direction estimation section that estimates a direction in which a user exists as seen from the display unit; and a display control section that orients a front face of the three-dimensional object displayed by the display unit in the direction in which the user exists estimated by the direction estimation section.

25 Claims, 20 Drawing Sheets

(51) Int. Cl.
*G06F 3/0488* (2022.01)
*G06F 3/14* (2006.01)
*G06T 7/70* (2017.01)

(56) References Cited

U.S. PATENT DOCUMENTS

| | | | |
|---|---|---|---|
| 2018/0144721 A1* | 5/2018 | Nemoto | G09G 5/38 |
| 2019/0243153 A1* | 8/2019 | Haseltine | G02B 30/56 |
| 2019/0324284 A1 | 10/2019 | Haseltine et al. | |

FOREIGN PATENT DOCUMENTS

| | | |
|---|---|---|
| JP | 2004012477 A | 1/2004 |
| JP | 2005189621 A | 7/2005 |
| JP | 2005275398 A | 10/2005 |
| JP | 2006-189962 | 7/2006 |
| JP | 2010-082714 | 4/2010 |
| JP | 2012050791 A | 3/2012 |
| JP | 2014048565 A | 3/2014 |
| JP | 2015-232633 | 12/2015 |
| JP | 2016068197 A | 5/2016 |
| JP | 2017028692 A | 2/2017 |
| JP | 2018-084908 | 5/2018 |
| JP | 2019-095523 | 6/2019 |
| JP | 2019-135827 | 8/2019 |
| JP | 2019-139170 | 8/2019 |
| WO | WO-2016092464 A1 | 6/2016 |
| WO | WO 2018/163945 | 9/2018 |

OTHER PUBLICATIONS

[on-line] The technology of VoxonPhotonics which draws real 3-dimensional scenography on JP H 9-238369A [TGS2018] space, Japan, 4Gamer.net, Sep. 20, 2018.

* cited by examiner

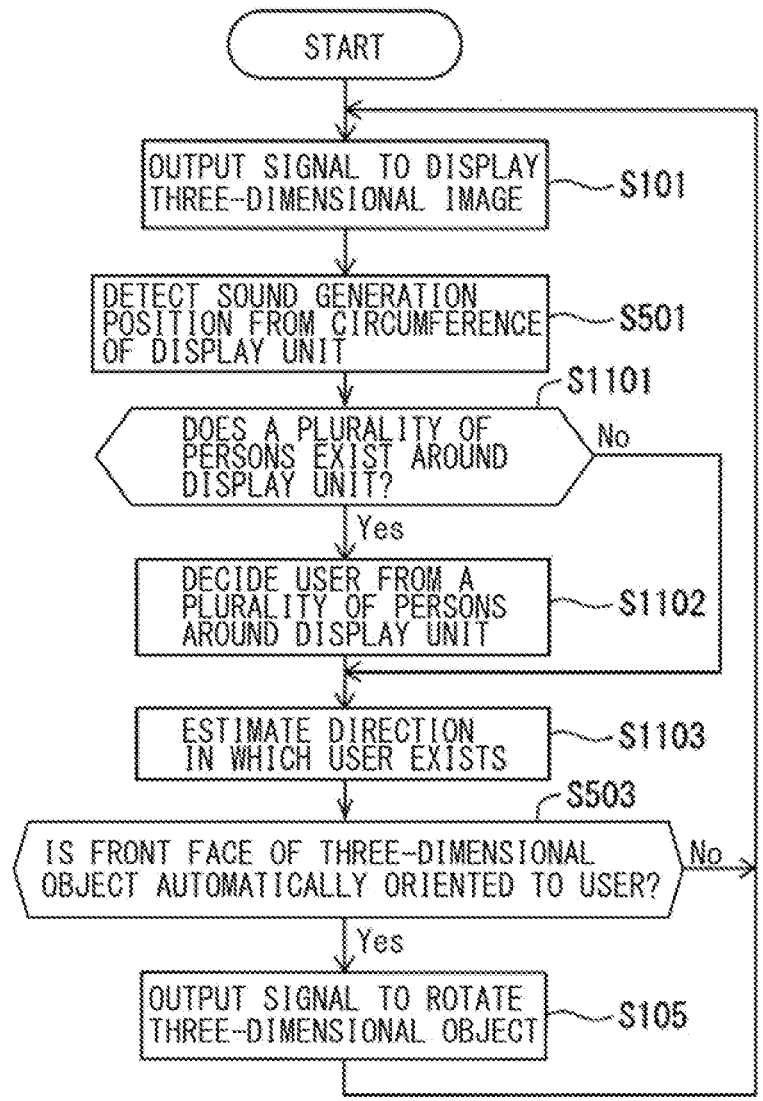

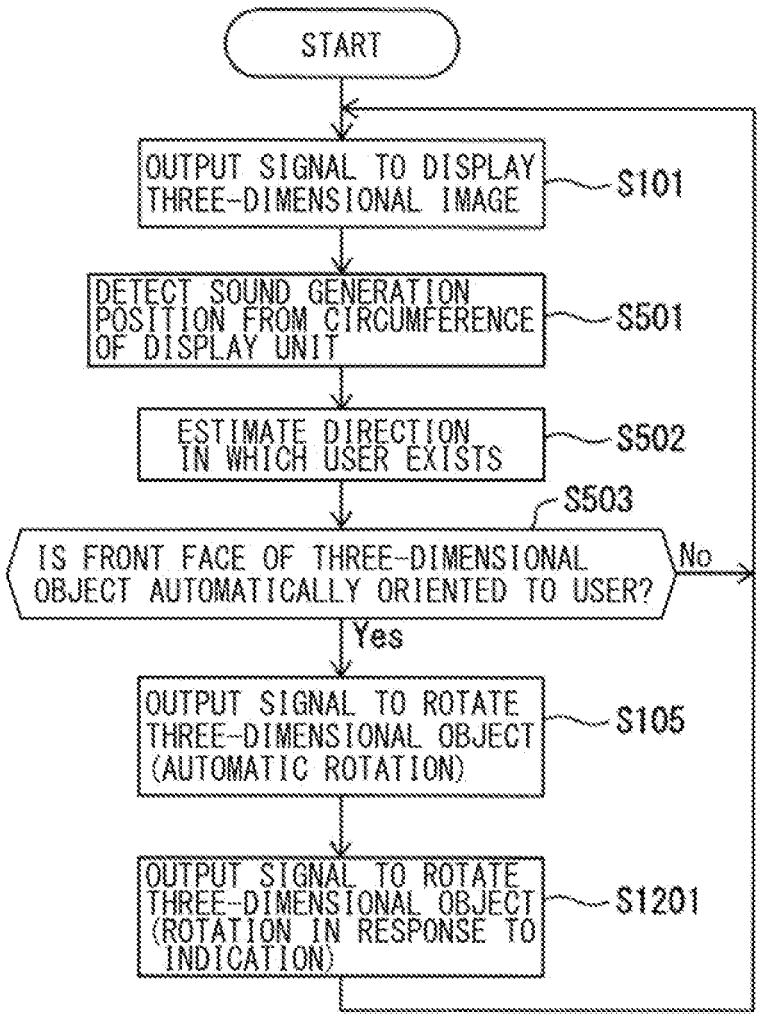

IMAGE DISPLAY APPARATUS

CROSS REFERENCE TO RELATED APPLICATIONS

This application is a national stage application under 35 U.S.C. 371 and claims the benefit of PCT Application No. PCT/JP2020/028273, having an international filing date of 21 Jul. 2020, which designated the United States, which PCT application claimed the benefit of Japanese Patent Application No. 2019-188504, filed 15 Oct. 2019, the entire disclosures of each of which are incorporated herein by reference.

TECHNICAL FIELD

The present technology relates to an image display apparatus.

BACKGROUND ART

There has heretofore been proposed an image display apparatus in which a cylindrical screen and a substantially disc-shaped mirror are stacked on upper side of a cylindrical base, and a color projector that scans laser light corresponding to each color of RGB is disposed at the center of the base, with an optical axis being vertically upward (e.g., see PTL 1). In the image display apparatus described in PTL 1, the color projector emits the laser light radially and vertically upward, and the emitted laser light is reflected radially toward the entire circumference of the screen by a reflective mirror. Then, a three-dimensional image, by which a three-dimensional object is visually recognizable from a plurality of circumferential directions, is displayed by the screen on which the laser light is reflected to the entire circumference, inside a space partitioned by the screen.

CITATION LIST

Patent Literature

PTL 1: International Publication No. WO2018/163945

SUMMARY OF THE INVENTION

Problem to be Solved by the Invention

However, in an image display apparatus described in PTL 1, in a case where a front face of a three-dimensional object is oriented in a direction different from that of a user and a side surface or the like of the three-dimensional object is oriented to the user, there is a possibility that information obtained by the user from the three-dimensional object may be small or that the user may be less likely to be attracted to the three-dimensional object.

An object of the present disclosure is to provide an image display apparatus that makes it possible to automatically orient a front face of a three-dimensional object represented by a three-dimensional image to a user.

Means for Solving the Problem

An image display apparatus of the present disclosure includes: (a) a display unit that displays a three-dimensional image, by which a three-dimensional object appears to exist in a space partitioned by members configuring an outer surface, to be visually recognizable from a plurality of circumferential directions; (b) a direction estimation section that estimates a direction in which a user exists as seen from the display unit; and (c) a display control section that orients a front face of the three-dimensional object displayed by the display unit in the direction in which the user exists estimated by the direction estimation section.

In addition, an image display apparatus of the present disclosure includes: (a) a display unit that displays a three-dimensional image, by which a three-dimensional object appears to exist in a space partitioned by members configuring an outer surface, to be visually recognizable from a plurality of circumferential directions; and (b) a touch panel provided on the outer surface of the display unit; and includes (c) a display control section that rotates, in a case where a flick operation is performed on the touch panel, the three-dimensional object displayed by the display unit in an orientation of the flick operation.

BRIEF DESCRIPTION OF THE DRAWINGS

FIG. 28 is a flowchart illustrating processing contents of control processing.

FIG. 29 is a flowchart illustrating processing contents of control processing according to a third modification example.

MODES FOR CARRYING OUT THE INVENTION

Hereinafter, description is given, with reference to FIGS. 1 to 29, of examples of an image display apparatus according to embodiments of the present disclosure. The embodiments of the present disclosure are described in the following order. It is to be noted that the present disclosure is not limited to the following examples. In addition, the effects described herein are illustrative and not limiting, and may have other effects.
1. First Embodiment: Image Display Apparatus
  1-1 Overall Configuration of Image Display Apparatus
  1-2 Contents of Control Processing
2. Second Embodiment: Image Display Apparatus
  2-1 Configuration of Main Part
3. Third Embodiment: Image Display Apparatus
  3-1 Configuration of Main Part
4. Fourth Embodiment: Image Display Apparatus
  4-1 Configuration of Main Part
5. Fifth Embodiment: Image Display Apparatus
  5-1 Configuration of Main Part
6. Modification Examples
  6-1 First Modification Example
  6-2 Second Modification Example
  6-3 Third Modification Example
  6-4 Other Modification Examples

1. FIRST EMBODIMENT

[1-1 Overall Configuration of Image Display Apparatus]

Figure 6:
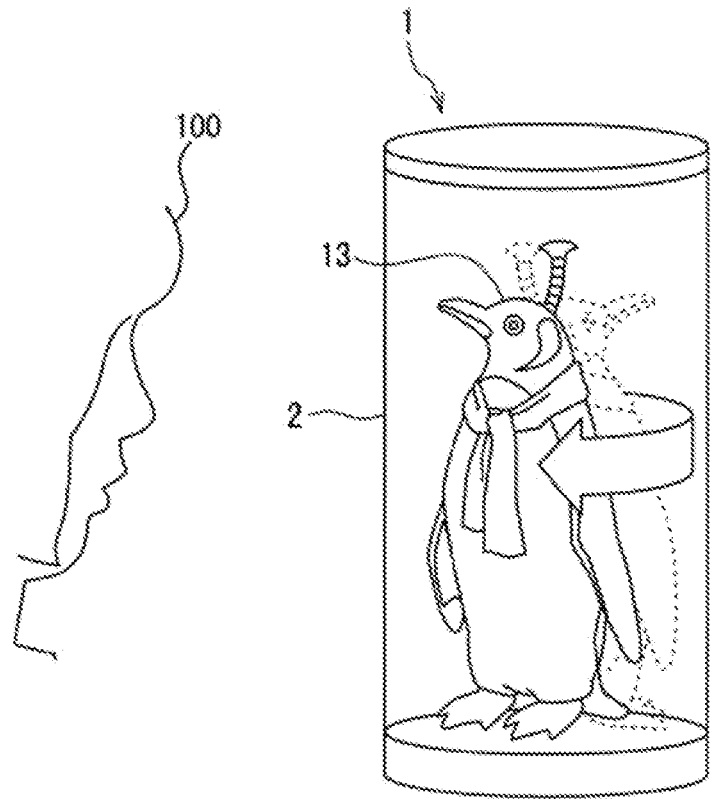
FIG. 6 illustrates an operation of the image display apparatus.

Description is given of an image display apparatus according to a first embodiment of the present disclosure. The image display apparatus 1 according to the first embodiment is a display apparatus that enables a three-dimensional image to be visually recognized from a plurality of circumferential directions. The image display apparatus 1 is sized to be small enough to be held by a user with one hand as illustrated in FIG. 6.

Figure 1:
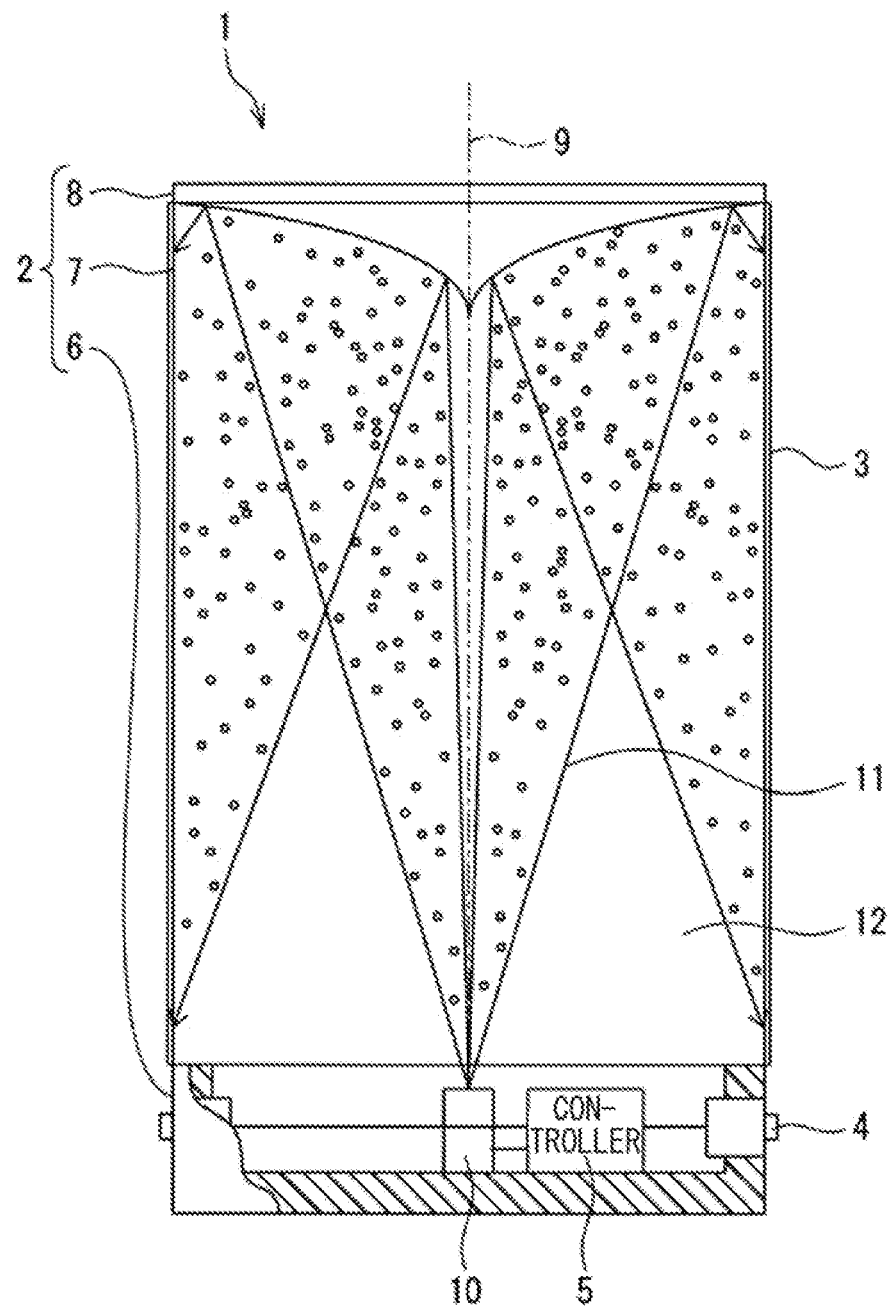
FIG. 1 illustrates an overall configuration of an image display apparatus according to a first embodiment.

As illustrated in FIG. 1, the image display apparatus 1 of the first embodiment includes a display unit 2, a touch panel 3, a plurality of cameras 4, and a controller 5. In FIG. 1, a portion of a base 6 is illustrated broken to enable a configuration inside the base 6 of the display unit 2 to be visually recognized.

The display unit 2 is formed by stacking, on upper side of the base 6 having a cylindrical shape with an upper surface being open and a lower surface being closed, a cylindrical screen 7, and a substantially disc-shaped reflective mirror 8 in this order.

At the center of the inside of the base 6, there is disposed an emission unit 10 with an optical axis 9 being vertically upward. As the emission unit 10, for example, there may be employed a color projector that displays each pixel by scanning laser light (hereinafter, also referred to as "image light 11") corresponding to each color of RGB. Then, the emission unit 10 emits the image light 11 to configure a three-dimensional image radially upward in accordance with a signal from the controller 5 to reflect the emitted image light 11 on the screen 7 with the reflective mirror 8. As the three-dimensional image, for example, there may be employed an image by which a three-dimensional object 13 (see FIG. 2) appears to exist in a space 12 partitioned by the screen 7.

Figure 2:
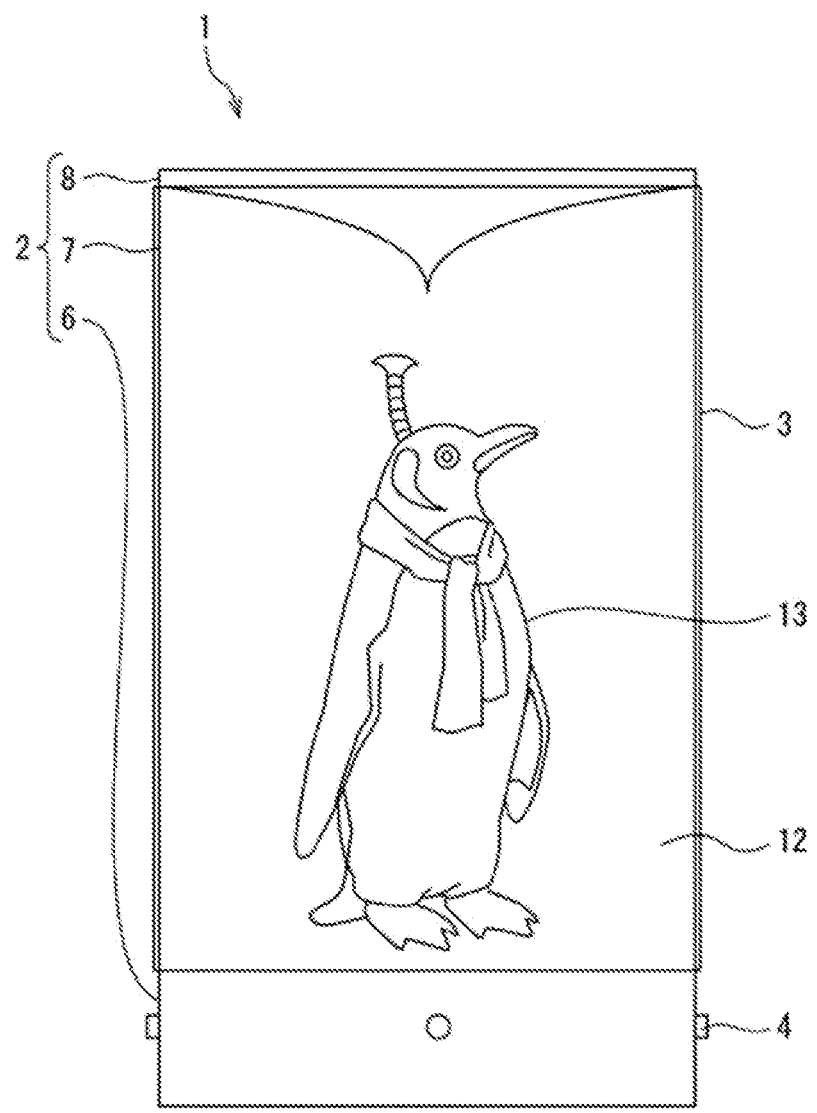
FIG. 2 illustrates the image display apparatus in which a three-dimensional image is displayed.

As the screen 7, for example, there may be employed a hologram screen on which a three-dimensional image is displayed by emitting the image light 11 that is incident in a diffusing manner. For example, it may be possible to employ a transmissive hologram that enables the screen 7 to be seen through, as described in International Publication No. WO2018/163945. According to the transmissive hologram, as illustrated in FIG. 2, back side of the image display apparatus 1 is visible from a location where the three-dimensional object 13 represented by the three-dimensional image is not displayed, thus enabling the screen 7 to feel like a container of transparent glass or the like. FIG. 2 exemplifies a case where a character of a king penguin is used as the three-dimensional object 13.

As the reflective mirror 8, there may be employed a mirror having below a reflective surface that reflects the image light 11 emitted from the emission unit 10. Then, the reflective mirror 8 reflects the image light 11 emitted radially upward from the emission unit 10 radially toward the entire circumference of the screen 7.

In the display unit 2 having the above configuration, the emission unit 10 emits the image light 11 radially upward, and the emitted image light 11 is reflected by the reflective mirror 8 radially toward the entire circumference of the screen 7, in accordance with the signal from the controller 5, as illustrated in FIG. 1. Then, the screen 7 on which the image light 11 is reflected to the entire circumference enables the three-dimensional image, by which the three-dimensional object 13 appears to exist in the space 12 partitioned by the screen 7, to be visually recognized from the plurality of circumferential directions, as illustrated in FIG. 2. At this time, allowing the screen 7 to feel like a container of transparent glass or the like enables the three-dimensional object 13 to appear to be contained in the container. This eliminates the need for a special device such as an HMD (Head Mounted Display), thus enabling the three-dimensional image to be seen without bothering to wear the device.

It is to be noted that, although the first embodiment gives the example of using, as the space 12, a space partitioned by the cylindrical screen 7, another configuration may also be employed. The space 12 may be a space partitioned by a member configuring an outwardly convex outer surface, and may be, for example, a space partitioned by the screen 7 having a semicylindrical shape, or may be a space partitioned by the screen 7 having a square tubular shape.

The touch panel 3 is provided on the entire circumference of an outer peripheral surface of the screen 7, and detects presence or absence of contact of a finger or the like as well as coordinates of a position of the contact. A result of the detection on the touch panel 3 is outputted to the controller 5.

Figure 3:
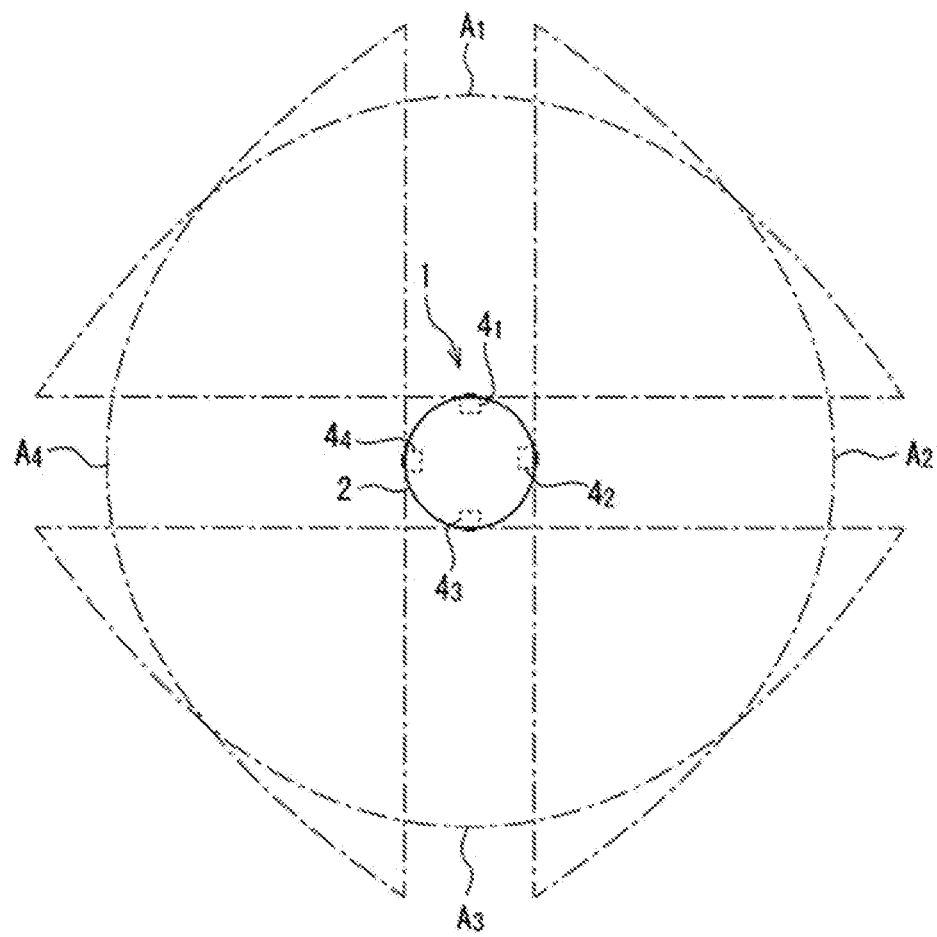
FIG. 3 illustrates an imaging range of each camera.

The respective cameras 4 are evenly spaced on sidewall parts of the base 6 to shoot a moving image of an image around the display unit 2. As the camera 4, for example, there may be employed a CCD camera or a CMOS camera. Each data of the moving image is outputted to the controller 5. FIGS. 1 to 3 exemplify a case where four cameras 4 having lens optical axes varied by 90° from each other are used to shoot 360° around the display unit 2. In addition, in FIG. 3, a region $A_1$ indicates a shooting range of a first camera 4 (also referred to as "$4_1$" in FIG. 3), a region $A_2$ indicates a shooting range of a second camera 4 (also referred to as "$4_2$" in FIG. 3), a region $A_3$ indicates a shooting range of a third camera 4 (also referred to as "$4_3$" in FIG. 3), and a region $A_4$ indicates a shooting range of a fourth camera 4 (also referred to as "$4_4$" in FIG. 3).

Figure 4:
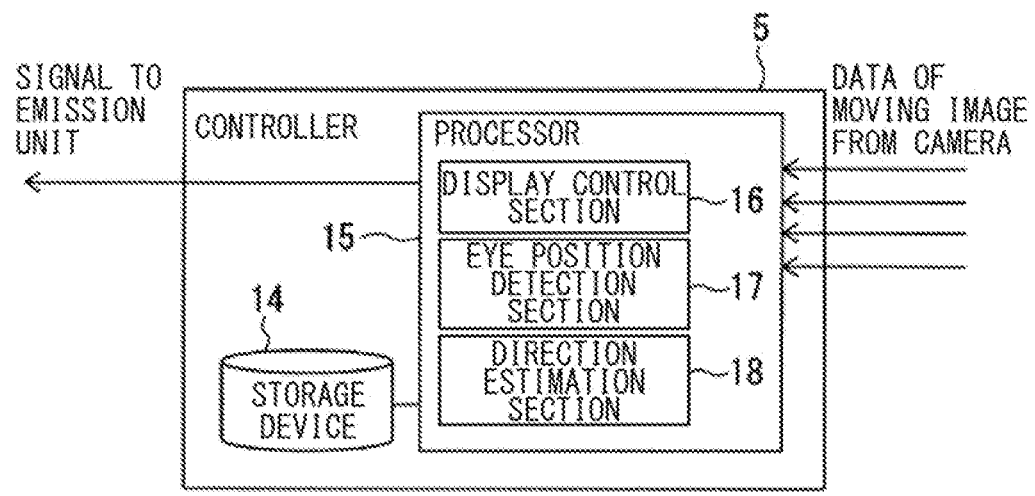
FIG. 4 illustrates an internal configuration of a controller.

The controller 5 is disposed inside the base 6, and includes hardware resources such as a storage device 14 and a processor 15 as illustrated in FIG. 4.

The storage device 14 stores a control program of the image display apparatus 1 executable by the processor 15. In addition, the storage device 14 stores various types of data necessary for executing the control program.

The processor 15 implements the display control section 16, an eye position detection section 17, and a direction estimation section 18, in accordance with the control programs stored in the storage device 14. Then, the display control section 16, the eye position detection section 17, and the direction estimation section 18 are used to output a signal to control the image light 11 to the emission unit 10 on the basis of the data of the moving image outputted from the camera 4, and to execute control processing to change an orientation of a front face of the three-dimensional object 13 represented by the three-dimensional image. The front face of the three-dimensional object 13 is set in advance at the time of manufacturing the image display apparatus 1. For example, a surface with the most abundant information is adopted.

[1-2 Contents of Control Processing]

Next, description is given of control processing to be executed by the display control section 16, the eye position detection section 17, and the direction estimation section 18, which are implemented by the processor 15. The control processing is executed when an unillustrated power source switch of the image display apparatus 1 is brought into an ON state.

Figure 5:
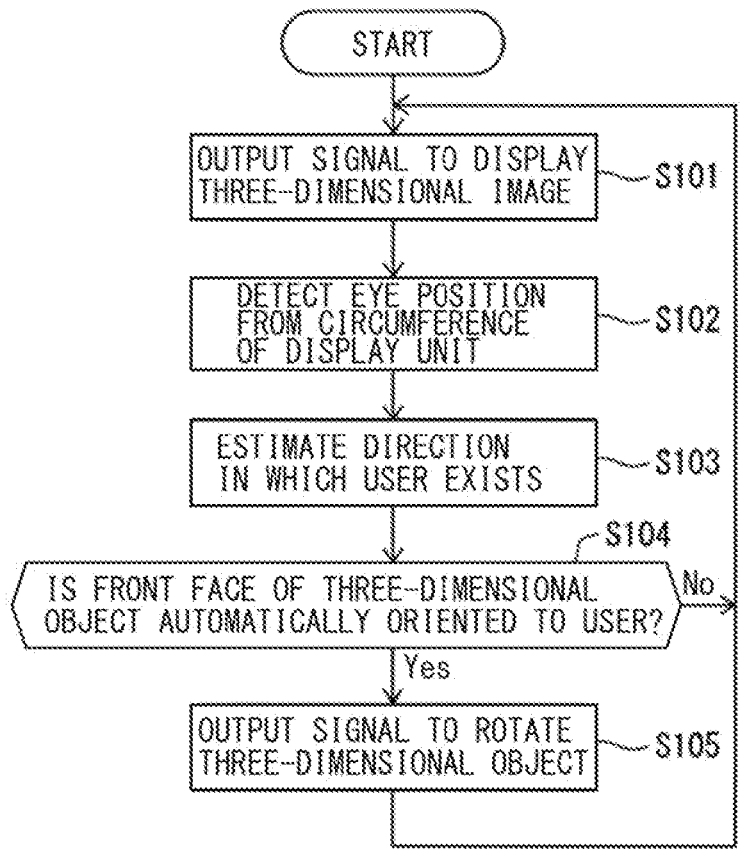
FIG. 5 is a flowchart illustrating processing contents of control processing.

As illustrated in FIG. 5, first, in step S101, the display control section 16 outputs, to the emission unit 10, a signal to emit the image light 11 for displaying a three-dimensional image on the display unit 2. At this time, for example, in a case where the three-dimensional object 13 is a character, a three-dimensional image is displayed in which the character performs some kind of action. In addition, for example, in a case where the three-dimensional object 13 is an organ to be subjected to an operation, a three-dimensional image is displayed in which the organ is realistically represented.

In addition, for example, in a case where the display control section 16 acquires a detection result outputted from the touch panel 3, and detects presence or absence of a flick operation on the touch panel 3 on the basis of the acquired detection result to determine that there is a flick operation, a configuration may be adopted in which a three-dimensional image to rotate the three-dimensional object 13 in an orientation of the flick operation is displayed. The rotational speed may be faster when acceleration or speed of a finger during the flick operation is fast, or may be slower when the acceleration or the speed is slow, for example. On an occasion when the flick operation is used to rotate the three-dimensional object 13, in a case where determination is made that there is a flick operation in the same direction as the rotational direction during the rotation of the three-dimensional object 13, the rotation of the three-dimensional object 13 is accelerated. Meanwhile, in a case where determination is made that there is a flick operation in a direction reverse to the rotational direction during the rotation of the three-dimensional object 13, the rotation of the three-dimensional object 13 is decelerated or the three-dimensional object 13 is reversely rotated. In addition, in a case where no flick operation is performed during the rotation of the three-dimensional object 13, the rotation of the three-dimensional object 13 is gradually damped. In addition, in a case where determination is made that there is a simple touch operation in which a finger is not moved to right and left during the rotation of the three-dimensional object 13, the rotation of the three-dimensional object 13 is braked. Thus, the flick operation of a user on the touch panel 3 enables the three-dimensional object 13 to be rotated to orient the front face of the three-dimensional object 13 in a desired direction.

Subsequently, in step S102, the eye position detection section 17 detects an eye position of a person who exists around the display unit 2. Specifically, first, moving image data outputted from each of the plurality of cameras 4 is acquired. Subsequently, on the basis of the acquired data, i.e., each result of shooting around the display unit 2, the eye position of the person who exists around the display unit 2 is detected. As a method for detecting the eye position, for example, there may be employed a method of performing pattern matching or the like on moving image data.

Subsequently, the processing proceeds to step S103, in which the direction estimation section 18 estimates a direction in which the user exists as seen from the display unit 2. Specifically, the direction in which the eye position is detected in step S102 is outputted as an estimation result of the direction in which the user exists.

Subsequently, the processing proceeds to step S104, in which the display control section 16 determines whether the front face of the three-dimensional object 13 represented by the three-dimensional image is automatically oriented to the user. Specifically, determination is made as to whether an angular difference between the direction in which the user exists estimated in step S103 and the direction of the front face of the three-dimensional object 13 represented by the three-dimensional image is larger than a predetermined value which has been determined in advance. As the predetermined value, for example, 1° to 5° may be employed. Then, in a case where determination is made that the angular difference is equal to or less than the predetermined value, determination is made that the front face of the three-dimensional object 13 has already been oriented to the user, and determination is made that the front face of the three-dimensional object 13 is not automatically oriented to the user (No); the processing returns to step S101. Meanwhile, in a case where determination is made that the angular difference is larger than the predetermined value, determination is made that the front face of the three-dimensional object 13 has not yet been oriented to the user, and determination is made that the front face of the three-dimensional object 13 is automatically oriented to the user (Yes); the processing proceeds to step S105.

In step S105, the display control section 16 outputs, to the emission unit 10, a signal to rotate the three-dimensional object 13 represented by the three-dimensional image. Specifically, first, there is sequentially created image data of a three-dimensional image to orient the front face of the three-dimensional object 13, which is displayed by the display unit 2, in the direction in which the user exists estimated in step S103. As the image data, for example, there may be used image data which rotates the three-dimensional object 13 to thereby change the orientation of the front face of the three-dimensional object 13 represented by the three-dimensional image. The rotation of the three-dimensional object 13 is performed at a constant speed with the optical axis 9 of the emission unit 10, i.e., the center axis of the screen 7 being set as a rotation axis. In addition, the rotational direction is decided to allow a rotational amount of the three-dimensional object 13 to be minimum.

In addition, at the same time, the display control section 16 sequentially converts the created image data into data of the image light 11 to sequentially output, to the emission unit 10, a signal to irradiate the image light 11 indicated by the data obtained by the conversion. Such a flow of the creation of the image data of the three-dimensional image→the conversion into the data of the image light 11→the output of the signal to the emission unit 10 is repeated until the front face of the three-dimensional object 13 is oriented in the direction in which the user exists. When the front face of the three-dimensional object 13 is oriented in the direction in which the user exists, the processing returns to step S101. Thus, in the display unit 2 of the image display apparatus 1, as illustrated in FIG. 6, the three-dimensional object 13 represented by the three-dimensional image is gradually rotated, and the front face of the three-dimensional object 13 is gradually oriented in a direction of a user 100. In FIG. 6, the king penguin drawn with a dotted line represents the three-dimensional object 13 before the rotation, whereas the king penguin drawn with a solid line represents the three-dimensional object 13 after the rotation, with the arrow indicating a rotational direction of the three-dimensional object 13.

As described above, in the image display apparatus 1 according to the first embodiment of the present disclosure, the direction in which the user exists as seen from the display unit 2 is estimated, and the front face of the three-dimensional object 13 displayed by the display unit 2 is oriented in the estimated direction. This enables the front face of the three-dimensional object 13 to be oriented to the user. Therefore, for example, in a case where the three-dimensional object 13 is a character and the front face of the three-dimensional object 13 is a face of the character, it is possible to show the user the face of the character, thus enabling the user to be fully attracted to the character. In addition, for example, in a case where the three-dimensional object 13 is an organ to be subjected to an operation and the front face of three-dimensional object is an inflammatory site of the organ, it is possible to show the user (e.g., a surgeon of the operation) the inflammatory site, thus making it possible to give a lot of information to the user.

In addition, in the image display apparatus 1 according to the first embodiment of the present disclosure, the eye position of a person who exists around the display unit 2 is detected, and the direction in which the eye position is detected is outputted as an estimation result of the direction in which the user exists. Therefore, it is possible to orient the front face of the three-dimensional object 13 to a person who is viewing the three-dimensional object 13.

In addition, in the image display apparatus 1 according to the first embodiment of the present disclosure, the camera 4 shoots an image around the display unit 2, and the eye position of a person is detected on the basis of a result of the shooting, thus making it possible to easily detect the eye of the person from the circumference of the display unit 2, and to easily estimate the direction in which the user exists.

In addition, in the image display apparatus 1 according to the first embodiment of the present disclosure, the rotation of the three-dimensional object 13 changes the orientation of the front face of the three-dimensional object 13 displayed by the display unit 2. Therefore, unlike the method of instantaneously switching the orientation of the three-dimensional object 13, for example, showing the rotation of the three-dimensional object 13 enables the user to grasp that the image display apparatus 1 recognizes a user's intention to orient the front face of the three-dimensional object 13 toward the user, and to proceed with the operation without anxiety.

In addition, in the image display apparatus 1 according to the first embodiment of the present disclosure, the rotational direction of the three-dimensional object 13 is decided to allow the rotational amount of the three-dimensional object 13 to be minimum. Therefore, it is possible to shorten the time required for the front face of the three-dimensional object 13 to be oriented in the direction in which the user exists, thus making it possible to prevent the rotational time from being longer.

In addition, in the image display apparatus 1 according to the first embodiment of the present disclosure, in a case where the flick operation is performed on the touch panel 3, the three-dimensional object 13 displayed by the display unit 2 is rotated in the orientation of the flick operation. Therefore, the flick operation on the touch panel 3 enables the user to rotate the three-dimensional object 13 to orient the front face of the three-dimensional object 13 in a desired direction.

2. SECOND EMBODIMENT: IMAGE DISPLAY APPARATUS

[2-1 Configuration of Main Part]

Next, description is given of an image display apparatus according to a second embodiment of the present disclosure. An overall configuration of the image display apparatus of the second embodiment is similar to that illustrated in FIG. 1, and thus illustration thereof is omitted.

Figure 7:
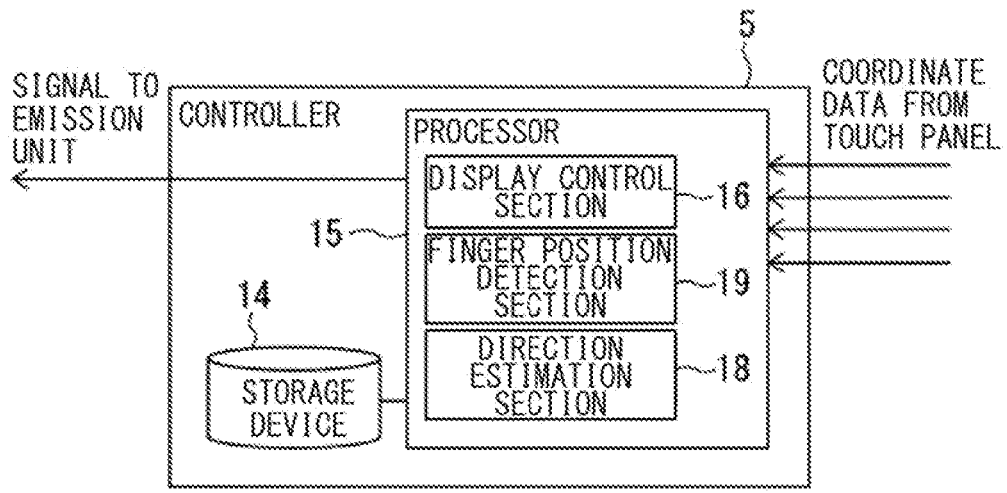
FIG. 7 illustrates an internal configuration of a controller according to a second embodiment.
Figure 8:
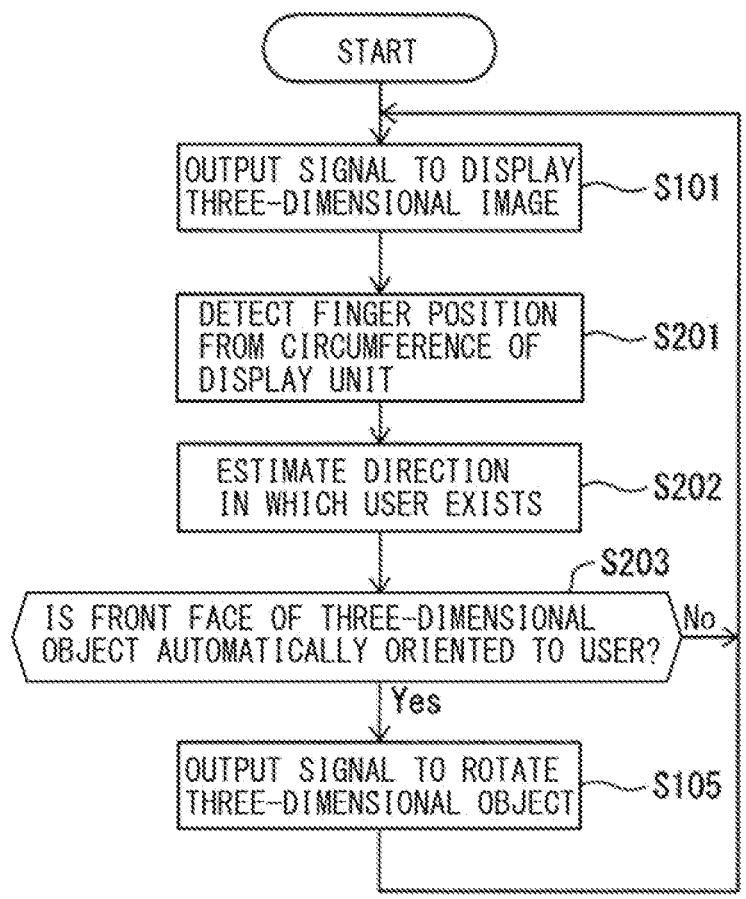
FIG. 8 is a flowchart illustrating processing contents of control processing.

The image display apparatus 1 of the second embodiment differs from that of the first embodiment in that the front face of the three-dimensional object 13 is oriented in a direction in which a user exists in a case where the user makes a pre-registered finger gesture. Specifically, as illustrated in FIG. 7, the second embodiment adopts a configuration in which a finger position detection section 19 is implemented instead of the eye position detection section 17. In addition, as illustrated in FIG. 8, a configuration is adopted in which steps S201, S202, and S203 are provided instead of steps S102, S103, and S104 of the control processing illustrated in FIG. 5.

In step S201, the finger position detection section 19 detects a finger position of a person who exists around the display unit 2. Specifically, first, moving image data outputted from each of the plurality of cameras 4 is acquired. Subsequently, on the basis of the acquired data, i.e., each result of shooting around the display unit 2, the finger position of the person who exists around the display unit 2 is detected. As a method for detecting the finger position, for example, there may be employed a method of performing pattern matching or the like on moving image data.

Subsequently, the processing proceeds to step S202, in which the direction estimation section 18 estimates a direction in which the user exists as seen from the display unit 2. Specifically, the direction in which the finger position is detected in step S201 is outputted as a result of the estimation of the direction in which the user exists.

Subsequently, the processing proceeds to step S203, in which the display control section 16 determines whether the front face of the three-dimensional object 13 represented by the three-dimensional image is automatically oriented to the user. Specifically, determination is made as to whether a trajectory of the finger position detected in step S201 indicates a pre-registered finger gesture detected in step S201. As the finger gesture, for example, there may be employed a clapping operation, a waving operation with both hands, or a waving operation with one hand, in such a state that the hand is oriented in a direction of the image display apparatus 1. Then, in a case where determination is made that the trajectory of the detected finger position does not indicate the pre-registered gesture, the display control section 16 determines that the front face of the three-dimensional object 13 is not automatically oriented to the user (No), and the processing returns to S101. Meanwhile, in a case where determination is made that the gesture is the pre-registered gesture, the display control section 16 determines that the front face of the three-dimensional object 13 is automatically oriented to the user (Yes), and the processing proceeds to step S105.

As described above, in the image display apparatus 1 according to the second embodiment of the present disclosure, a finger of the person who exists around the display unit 2 is detected, and the direction in which the finger position is detected is outputted as an estimation result of the direction in which the user exists. Thus, for example, it is possible to orient the front face of the three-dimensional object 13 to a person who made a finger gesture, when the finger gesture is made for the three-dimensional object 13.

In addition, in the image display apparatus 1 according to the second embodiment of the present disclosure, the circumference of the display unit 2 is shot by the camera 4 to detect the finger position on the basis of the result of the shooting, thus making it possible to easily detect the finger position from the circumference of the display unit 2, and thus to easily estimate the direction in which the user exists.

THIRD EMBODIMENT: IMAGE DISPLAY APPARATUS

[3-1 Configuration of Main Part]

Next, description is given of an image display apparatus according to a third embodiment of the present disclosure. An overall configuration of the image display apparatus of the third embodiment is similar to that illustrated in FIG. 1, and thus illustration thereof is omitted.

Figure 9:
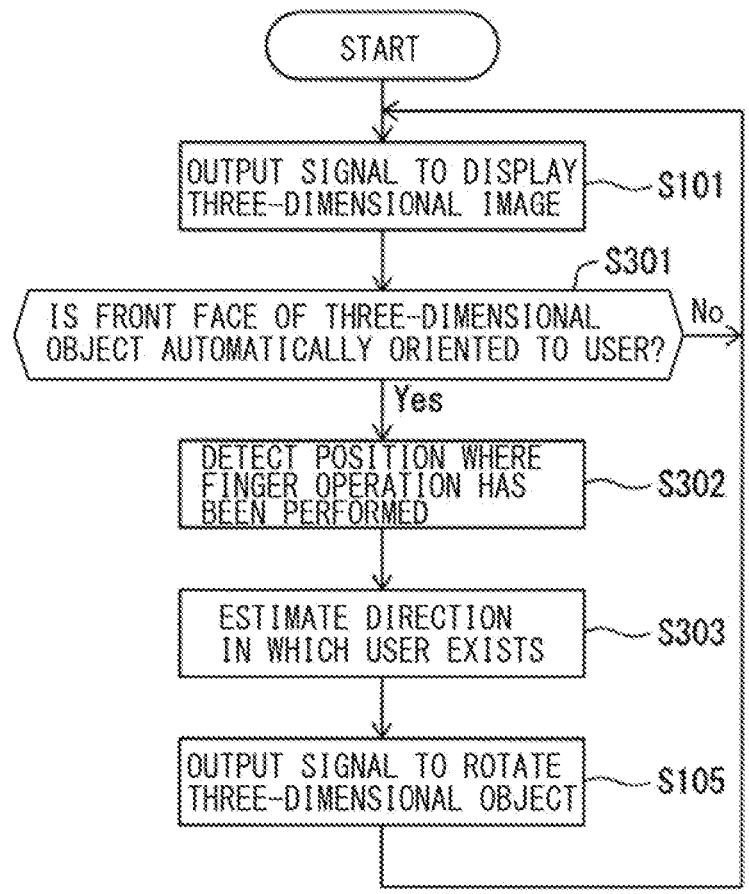
FIG. 9 is a flowchart illustrating processing contents of control processing according to a third embodiment.

The image display apparatus 1 of the third embodiment differs from that of the first embodiment in that the front face of the three-dimensional object 13 is oriented in the direction in which a user exists in a case where the user performs a flick operation on the touch panel 3. Specifically, in the third embodiment, as illustrated in FIG. 9, a configuration is adopted in which steps S301, S302, and S303 are provided instead of steps S102, S103, and S104 of the control processing illustrated in FIG. 5.

In step S301, as for the display control section 16, the display control section 16 determines whether the front face of the three-dimensional object 13 represented by the three-dimensional image is automatically oriented to the user. Specifically, first, a detection result outputted from the touch panel 3 is acquired. Subsequently, determination is made as to whether a finger is in contact with the touch panel 3 on the basis of the acquired detection result (information on presence or absence of contact of a finger or the like). Then, in a case where determination is made that a finger is not in contact with the touch panel 3, determination is made that the front face of the three-dimensional object 13 is not automatically oriented to the user (No), and the processing returns to step S101. Meanwhile, in a case where determination is made that a finger is in contact with the touch panel 3, determination is made that the front face of the three-dimensional object 13 is automatically oriented to the user (Yes), and the processing proceeds to step S302.

In step S302, the direction estimation section 18 detects a position, of the touch panel 3, where a finger operation has been performed. Specifically, information on coordinates of the contact position of a finger or the like is acquired from a result of the detection acquired from the touch panel 3 in step S301.

Subsequently, the processing proceeds to step S303, in which the direction estimation section 18 estimates a direction in which the user exists as seen from the display unit 2. Specifically, a normal direction at the position on the touch panel 3 detected in step S302 is outputted as a result of the estimation of the direction in which the user exists.

As described above, in the image display apparatus 1 according to the third embodiment of the present disclosure, the position, of the touch panel 3, where the finger operation has been performed is detected, and the normal direction at the detected position is outputted as an estimation result of the direction in which the user exists. Therefore, for example, when the flick operation is performed on the touch panel 3, the three-dimensional object 13 is able to be rotated in the orientation of the flick operation, and the rotation is able to be to be stopped in such a state that the front face of the three-dimensional object 13 is oriented toward the person who performed the flick operation.

It is to be noted that, in the image display apparatus 1 according to the third embodiment of the present disclosure, the following configuration may be adopted. In a case where determination is made as to whether a state in which the front face of the three-dimensional object 13 is oriented in a direction different from the direction in which the user exists continues for a predetermined period of time or longer to determine that such a state continues for the predetermined period of time or longer, the front face of the three-dimensional object 13 represented by the three-dimensional image is automatically oriented in the direction in which the user exists.

4. FOURTH EMBODIMENT: IMAGE DISPLAY APPARATUS

[4-1 Configuration of Main Part]

Next, description is given of an image display apparatus according to a fourth embodiment of the present disclosure. An overall configuration of the image display apparatus of the fourth embodiment is similar to that illustrated in FIG. 1, and thus illustration thereof is omitted.

Figure 10:
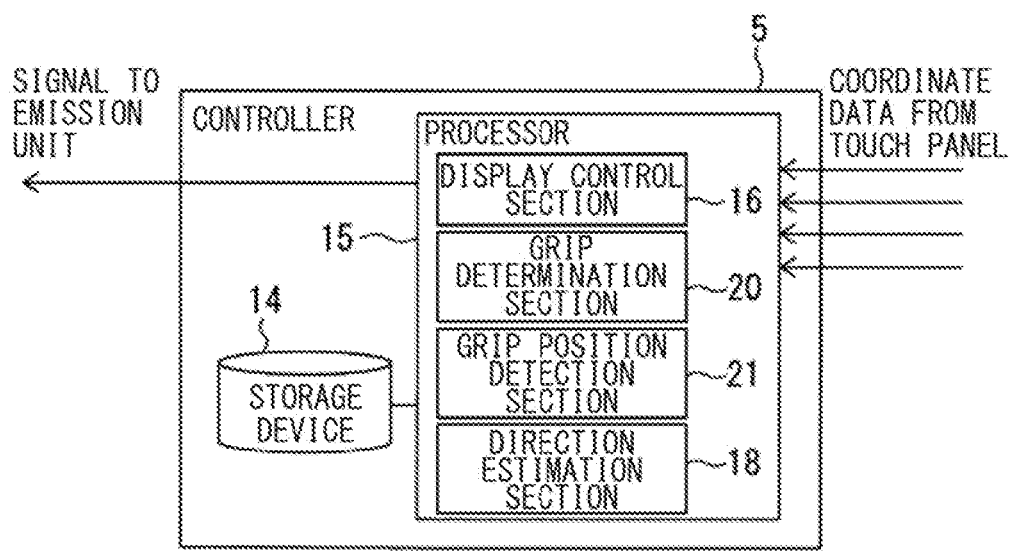
FIG. 10 illustrates an internal configuration of a controller according to a fourth embodiment.
Figure 11:
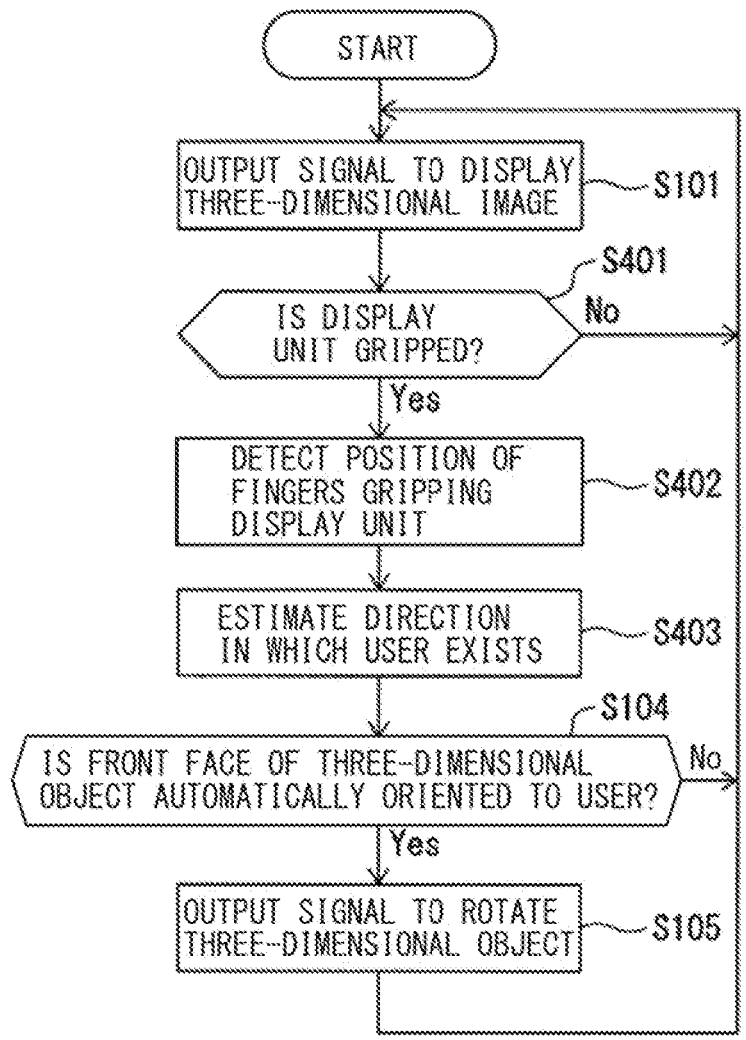
FIG. 11 is a flowchart illustrating processing contents of control processing.

The image display apparatus 1 of the fourth embodiment differs from that of the first embodiment in that the front face of the three-dimensional object 13 is oriented in a direction in which a user exists in a case where the user grips the display unit 2. Specifically, in the fourth embodiment, as illustrated in FIG. 10, a configuration is adopted to implement a grip determination section 20 and a grip position detection section 21 instead of the eye position detection section 17. In addition, as illustrated in FIG. 11, steps S401 and S402 are provided instead of steps S102 and S103 of the control processing illustrated in FIG. 5.

In step S401, the grip determination section 20 determines whether the display unit 2 is gripped. Specifically, first, a detection result outputted from the touch panel 3 is acquired. Subsequently, determination is made as to whether a plurality of fingers is in contact with the touch panel 3 on the basis of the acquired detection result (information on coordinates of the contact position of fingers or the like). Then, in a case where determination is made that the plurality of fingers is not in contact with the touch panel 3, determination is made that the display unit 2 is not gripped (No), and the processing returns to step S101. Meanwhile, in a case where determination is made that the plurality of fingers is in contact with the touch panel 3, determination is made that the display unit 2 is gripped (Yes), and the processing proceeds to step S402.

In step S402, the grip position detection section 21 detects the position of fingers gripping the display unit 2. Specifically, on the basis of a result of the detection acquired from the touch panel 3 in step S401, the position of the fingers in contact with the touch panel 3 is detected, and the detected finger position is set as the position of the fingers gripping the display unit 2. The position of the fingers is represented, for example, by a palm-like region including a plurality of coordinates outputted from the touch panel 3.

Subsequently, the processing proceeds to step S403, in which the direction estimation section 18 estimates a direction in which the user exists as seen from the display unit 2, on the basis of the detection result of the position of the fingers gripping the display unit 2. Specifically, a normal direction at a position on the touch panel 3 farthest from the region detected in step S402 is outputted as a result of the estimation of the direction in which the user exists.

Figure 12:
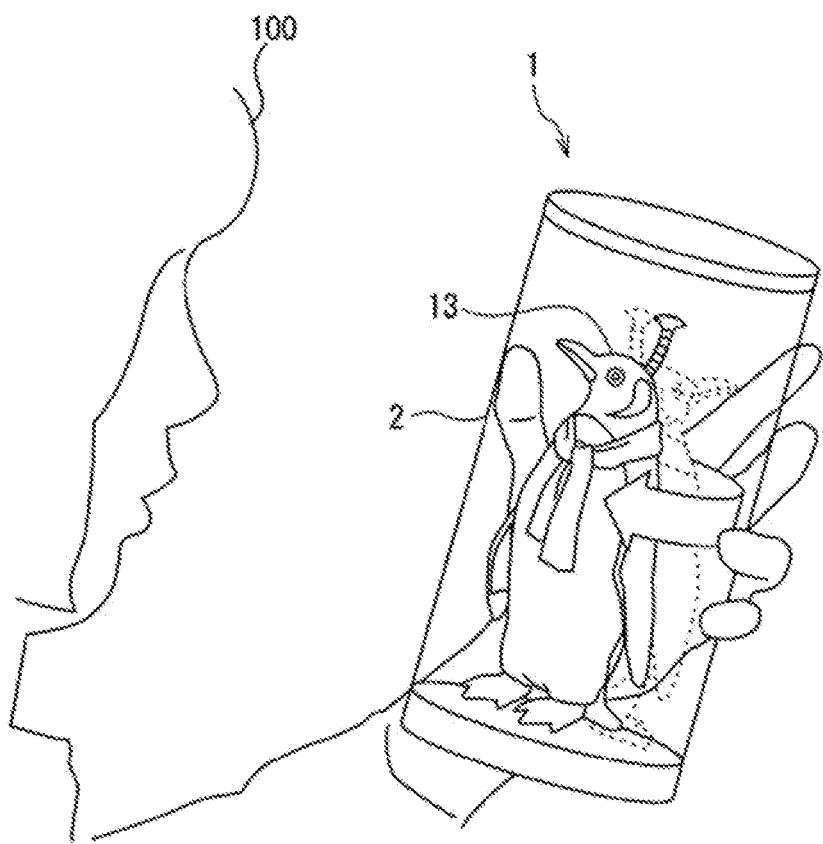
FIG. 12 illustrates an operation of the image display apparatus.

As described above, in the image display apparatus 1 according to the fourth embodiment of the present disclosure, in a case where determination is made as to whether the display unit 2 is gripped to determine that the display unit 2 is gripped, the position of the fingers gripping the display unit 2 is detected to estimate the direction in which the user exists on the basis of a result of the detection. Here, for example, as illustrated in FIG. 12, in a case of gripping the display unit 2 and looking at the gripped display unit 2, the user 100 is considered to grip a portion on side opposite to a portion facing a face of the user 100. Therefore, on the basis of the finger position, the position of the face of the user 100 is able to be estimated, and thus the front face of the three-dimensional object 13 is able to be oriented to the user.

In addition, in the image display apparatus 1 according to the fourth embodiment of the present disclosure, the position of the fingers gripping the display unit 2 is detected on the basis of the detection result of the touch panel 3, thus making it possible to easily detect the position of the fingers gripping the display unit 2 and to easily estimate the direction of the user 100.

5. FIFTH EMBODIMENT: IMAGE DISPLAY APPARATUS

[5-1 Configuration of Main Part]

Next, description is given of an image display apparatus according to a fifth embodiment of the present disclosure. An overall configuration of the image display apparatus of the fifth embodiment is similar to that illustrated in FIG. 1, and thus illustration thereof is omitted.

Figure 13:
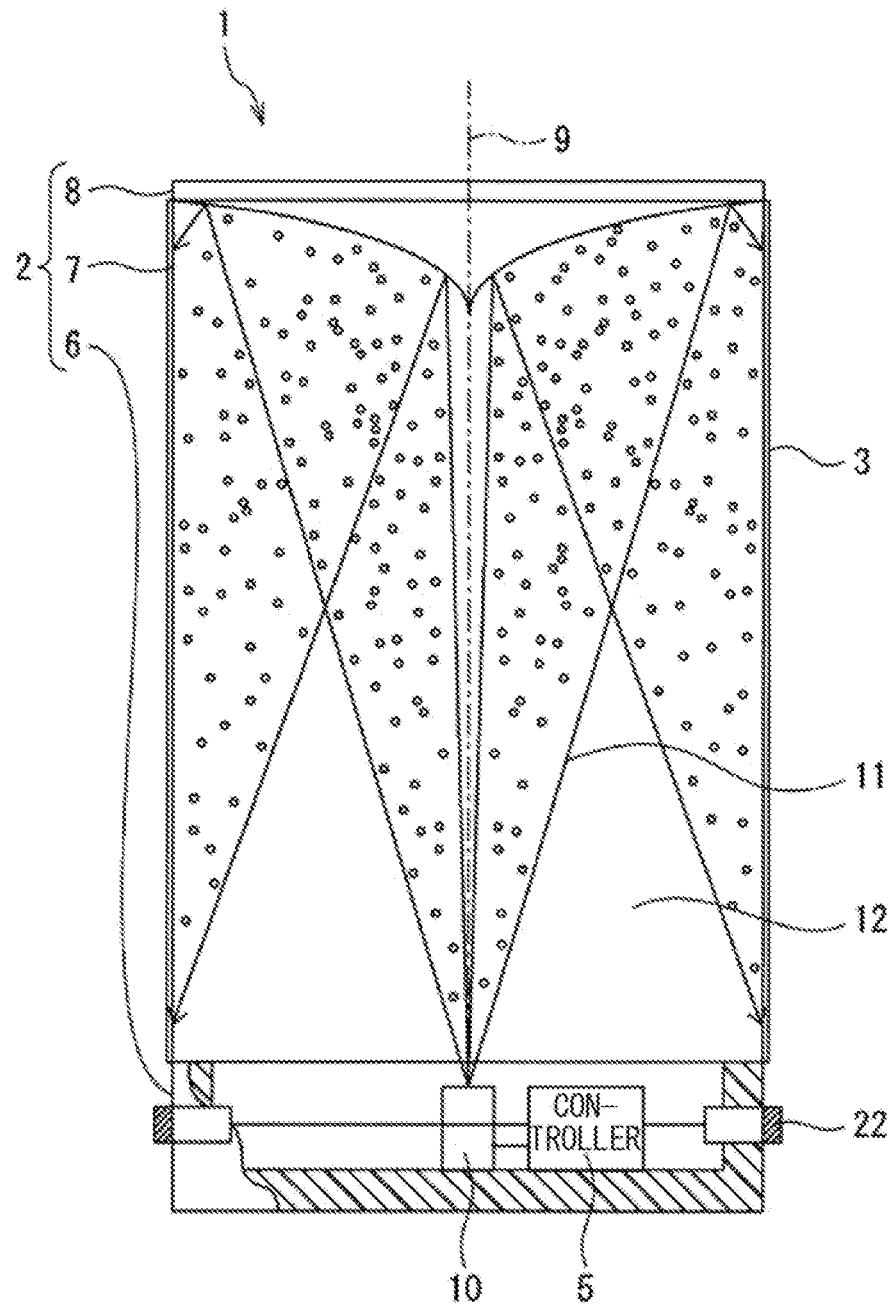
FIG. 13 illustrates an overall configuration of an image display apparatus according to a fifth embodiment.
Figure 14:
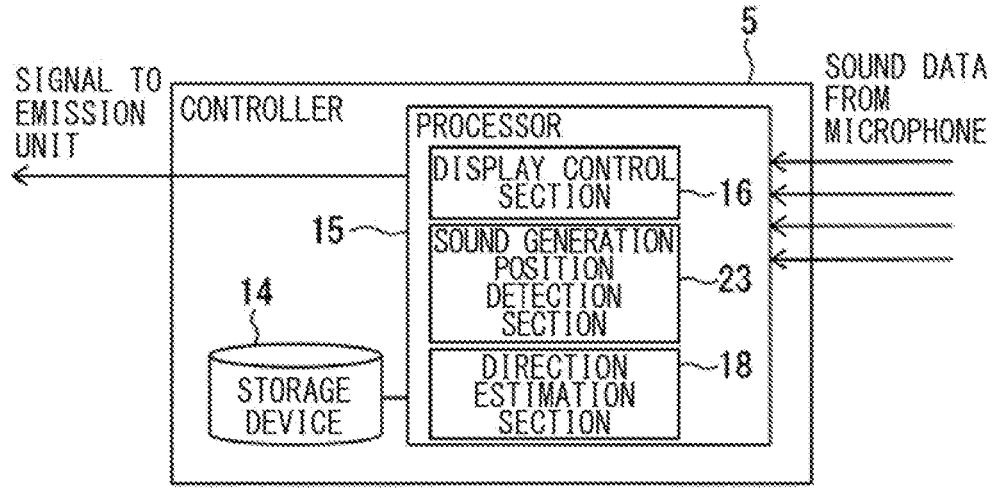
FIG. 14 illustrates an internal configuration of a controller.
Figure 15:
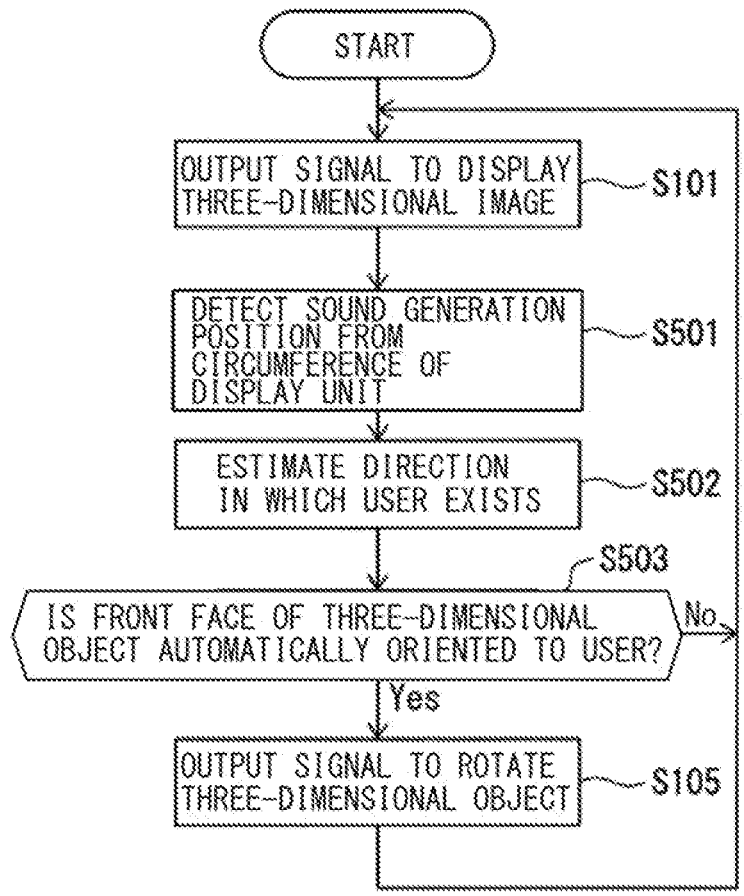
FIG. 15 is a flowchart illustrating processing contents of control processing.

The image display apparatus 1 of the fifth embodiment differs from that of the first embodiment in that, the front face of the three-dimensional object 13 is oriented in a direction in which a user exists in a case where the user generates a pre-registered sound. Specifically, in the fifth embodiment, as illustrated in FIG. 13, a configuration is adopted in which microphones 22 are provided instead of the cameras 4. In addition, as illustrated in FIG. 14, a configuration is adopted to implement a sound generation position detection section 23 instead of the eye position detection section 17. In addition, as illustrated in FIG. 15, steps S501, S502, and S503 are provided instead of steps S102, S103, and S104 of the control processing illustrated in FIG. 5.

Figure 16:
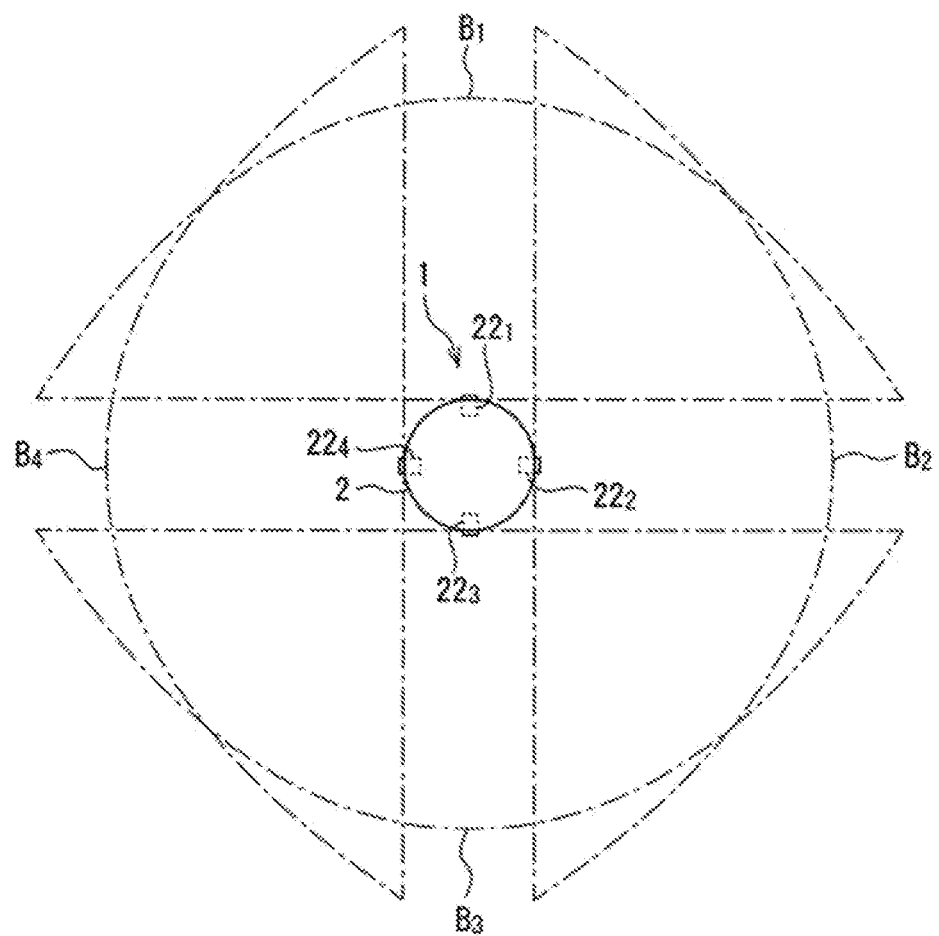
FIG. 16 illustrates a sound collection range of each microphone.

The respective microphones 22 are evenly spaced on the sidewall parts of the base 6 to acquire a sound around the display unit 2. As the microphone 22, for example, there may be employed a microphone with high directivity. Each data of the sound is outputted to the controller 5. FIGS. 13 and 16 exemplify a case where four microphones 22 having directive orientations varied by 90° from each other are used to collect a sound at 360° around the display unit 2. In FIG. 16, a region $B_1$ indicates a sound collection range of a first microphone 22 (also referred to as "22$_1$" in FIG. 16), a region $B_2$ indicates a sound collection range of a second microphone 22 (also referred to as "22$_2$" in FIG. 16), a region $B_3$ indicates a sound collection range of a third microphone 22 (also referred to as "22$_3$" in FIG. 16), and a region $B_4$ indicates a sound collection range of a fourth microphone 22 (also referred to as "22$_4$" in FIG. 16).

It is to be noted that, although the example has been given in which a plurality of microphones 22 is used in the image display apparatus 1 according to the fifth embodiment of the present disclosure, other configurations may also be employed. For example, a configuration may be employed in which only one microphone 22 is provided, and the microphone 22 is moved to specify a sound source by utilizing Doppler effect.

In step S501, the sound generation position detection section 23 detects a generation position of a sound generated around the display unit 2. Specifically, first, data of sound outputted from each of the plurality of microphones 22 is acquired. Subsequently, on the basis of the acquired data, i.e., each sound collection result around the display unit 2, the generation position of the sound generated around the display unit 2 is detected. As the method for detecting the generation position of the sound, for example, a method described in Japanese Unexamined Patent Application Publication No. 2016-5181 may be employed. Japanese Unexamined Patent Application Publication No. 2016-5181 describes a method of calculating an amplitude ratio among the microphones 22 and selecting a microphone output ratio closest to the calculated amplitude ratio from among microphone output ratios specified in sound source positional information in which directivity characteristics of the microphones 22 and damping due to a distance between the sound source and the microphone 22 are reflected to acquire a sound source position corresponding to the selected microphone output ratio, with reference to the sound source positional information.

Subsequently, the processing proceeds to step S502, in which the direction estimation section 18 estimates a direction in which the user exists. Specifically, the direction in which the generation position of the sound is detected in step S501 is outputted as a result of the estimation of the direction in which the user exists.

Subsequently, the processing proceeds to step S503, in which the display control section 16 determines whether the front face of the three-dimensional object 13 represented by the three-dimensional image is automatically oriented to the user. Specifically, determination is made as to whether the sound acquired in step S501 includes a pre-registered sound. Examples of the pre-registered sounds include a voice calling a name of the image display apparatus 1, a voice calling a name of the three-dimensional object 13 displayed on the display unit 2, and a clapping sound. Then, in a case where determination is made that the acquired sound includes no pre-registered sound, the display control section 16 determines that the front face of the three-dimensional object 13 is not automatically oriented to the user (No), and the processing returns to step S101. Meanwhile, in a case where determination is made that the sound includes the pre-registered sound, determination is made that the front face of the three-dimensional object 13 is automatically oriented to the user (Yes), and the processing proceeds to step S105.

As described above, in the image display apparatus 1 according to the fifth embodiment of the present disclosure, the generation position of the sound generated around the display unit 2 is detected, and the direction in which the generation position of the sound is detected is outputted as an estimation result of the direction in which the user exists. Therefore, for example, when a call or the like is made to the three-dimensional object 13, the front face of the three-dimensional object 13 is able to be oriented to a person who made the call or the like.

In addition, in the image display apparatus 1 according to the fifth embodiment of the present disclosure, a sound around the display unit 2 is acquired by the microphone 22, and the generation position of the sound is detected on the basis of a result of the acquisition. This makes it possible to detect a position of a person who generates a sound by calling to the three-dimensional object 13 with high accuracy. In addition, increasing the number of the microphone 22 makes it possible to detect the position of the user with higher accuracy.

In addition, in the image display apparatus 1 according to the fifth embodiment of the present disclosure, determination is made as to whether a sound acquired by the microphone 22 includes a pre-registered sound to determine that the pre-registered sound is included, the front face of the three-dimensional object 13 displayed by the display unit 2 is oriented in the estimated direction in which the user exists. Therefore, for example, the use of a voice or the like calling a name to the three-dimensional object 13 as a pre-registered sound makes it possible to prevent other voices of a conversation or the like from being falsely recognized as the calling voice, and thus to prevent the front face of the three-dimensional object 13 from being oriented to a person who makes no calling.

6. MODIFICATION EXAMPLES

[6-1 First Modification Example]

Figure 17:
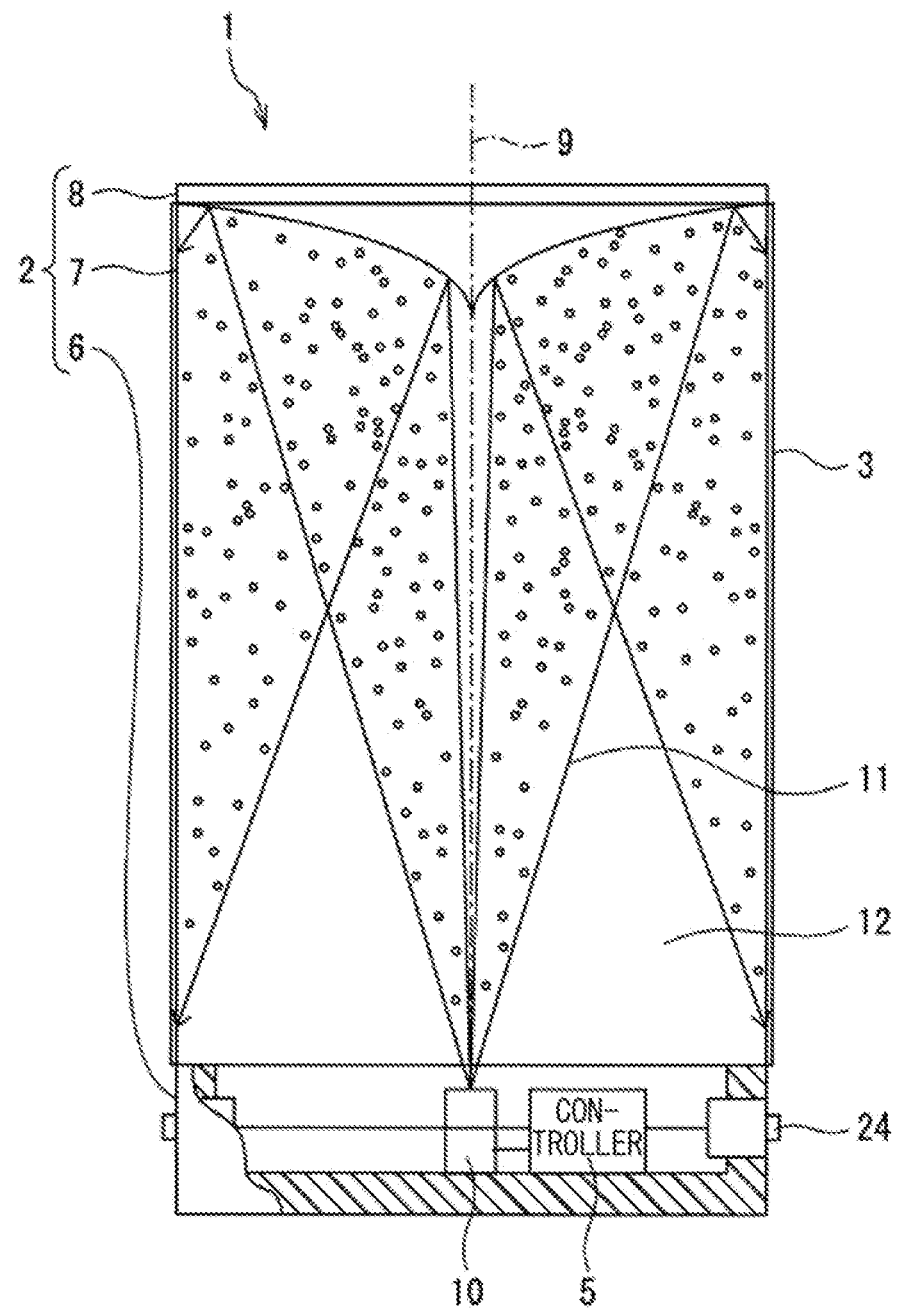
FIG. 17 illustrates an overall configuration of an image display apparatus according to a first modification example.

It is to be noted that, in the image display apparatus 1 according to each of the first and second embodiments of the present disclosure, the camera 4 is used to detect the eye position or the finger position of the user, but other configurations may also be employed. For example, as illustrated in FIG. 17, a configuration may be adopted to use a ranging sensor 24.

Figure 18:
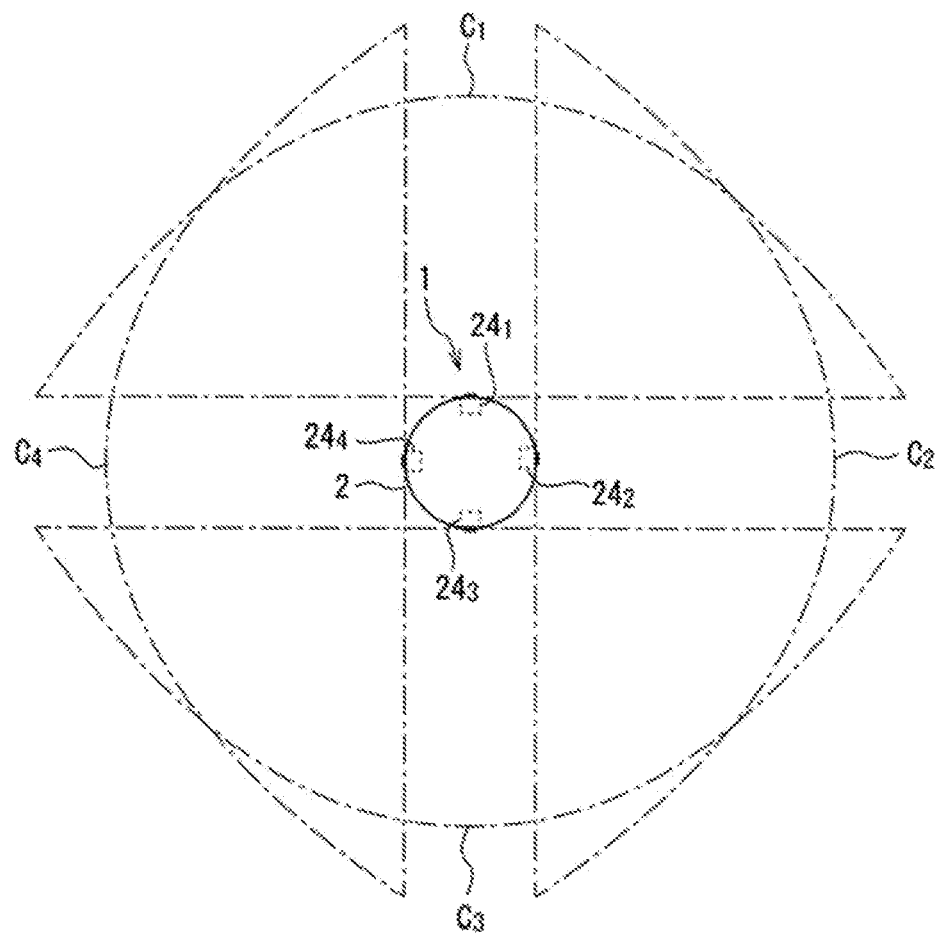
FIG. 18 illustrates a measurement range of each ranging sensor.

The respective ranging sensors 24 are evenly spaced on the sidewall parts of the base 6, and measure a distance to a plurality of points on a surface of a body around the display unit 2 to be able to detect an eye position of a person around the display unit 2 from a detection result. As the ranging sensor 24, for example, there may be employed a TOF (Time Of Flight) camera or a Structure Beam sensor. Each data of the distance is outputted to the controller 5. FIGS. 17 and 18 exemplify a case where four ranging sensors 24 having lens optical axes varied by 90° from each other are used to perform ranging 360° around the display unit 2. In addition, in FIG. 18, a region $C_1$ indicates a ranging range of a first ranging sensor 24 (also referred to as "24$_1$" in FIG. 18), a region $C_2$ indicates a ranging range of a second ranging sensor 24 (also referred to as "24$_2$" in FIG. 18), a region $C_3$ indicates a ranging range of a third ranging sensor 24 (also referred to as "24$_3$" in FIG. 18), and a region $C_4$ indicates a ranging range of a fourth ranging sensor 24 (also referred to as "24$_4$" in FIG. 18).

Figure 19:
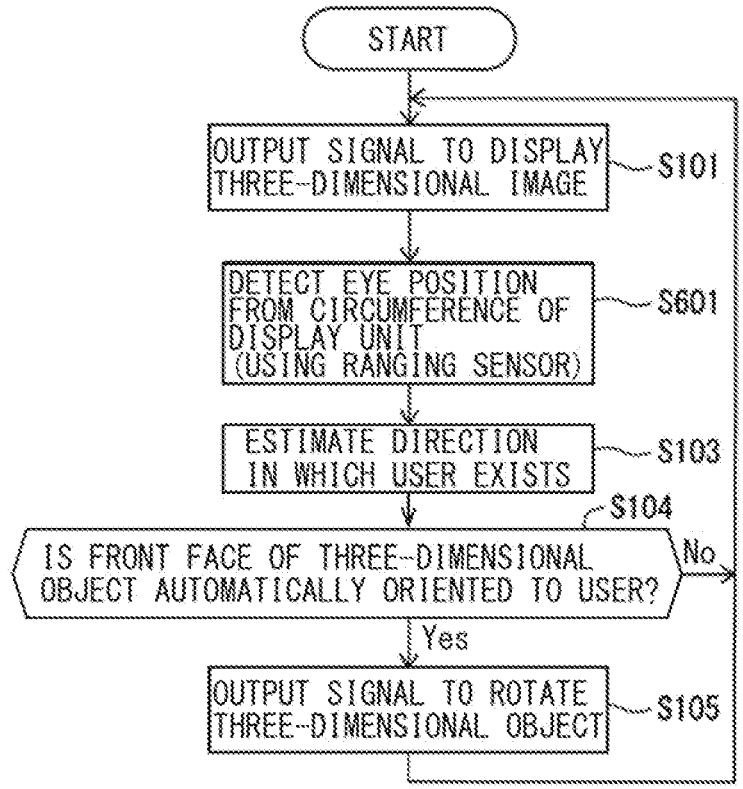
FIG. 19 is a flowchart illustrating processing contents of control processing.

In a case of applying the configuration of using the ranging sensor 24 to the first embodiment, a configuration is adopted in which step S601 is provided instead of step S102 of the control processing illustrated in FIG. 5, as illustrated in FIG. 19.

In step S601, the eye position detection section 17 detects the eye position of a person who exists around the display unit 2. Specifically, first, the data of the distance outputted from each of the plurality of ranging sensors 24 is acquired. Subsequently, on the basis of the acquired data, i.e., each result of the ranging around the display unit 2, the eye position of a person who exists around the display unit 2 is detected. As a method for detecting the eye position, for example, there may be employed a method of analysis, or the like of unevenness information obtained from the distance data.

In this manner, in the image display apparatus 1 according to the present modification example, distances to the plurality of points on the surface of the body around the display unit 2 are measured using the ranging sensor 24 to detect the eye position of the person on the basis of a result of the measurement. Therefore, for example, similarly to the case of using the camera 4, it is possible to easily detect eyes of the person from the circumference of the display unit 2, and thus to easily estimate the direction in which the user exists.

Figure 20:
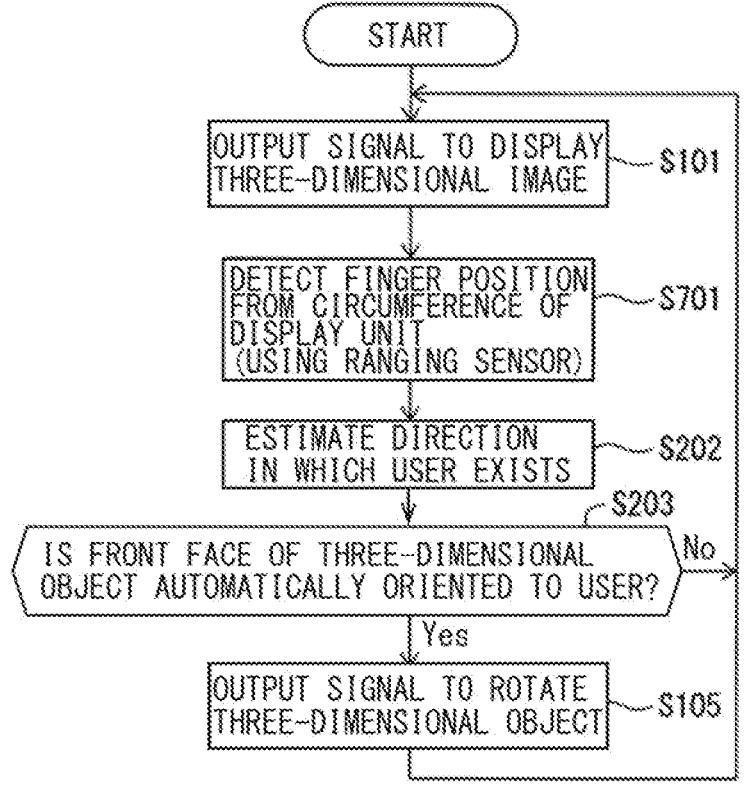
FIG. 20 is a flowchart illustrating processing contents of control processing.

It is to be noted that, although the example has been given in which the configuration of using the ranging sensor 24 is applied to the first embodiment, the configuration is also applicable to the second embodiment, for example. In the case of applying to the second embodiment, a configuration may be adopted in which step S701 is provided instead of step S201 of the image processing, as illustrated in FIG. 20.

In step S701, the finger position detection section 19 detects the finger position of a person who exists around the display unit 2. Specifically, first, the data of the distance outputted from each of the plurality of ranging sensors 24 is acquired. Subsequently, on the basis of the acquired data, i.e., each result of the ranging around the display unit 2, the finger position of a person who exists around the display unit 2 is detected. As a method for detecting fingers, there may be employed a method of analysis, or the like of unevenness information obtained from the distance data.

In this manner, in the image display apparatus 1 according to the present modification example, distances to the plurality of points on the surface of the body around the display unit 2 are measured using the ranging sensor 24 to detect the finger position of the person on the basis of a result of the measurement. Therefore, for example, similarly to the case of using the camera 4, it is possible to easily detect fingers of the person from the circumference of the display unit 2, and thus to easily estimate the direction in which the user exists.

[6-2 Second Modification Example]

Figure 21:
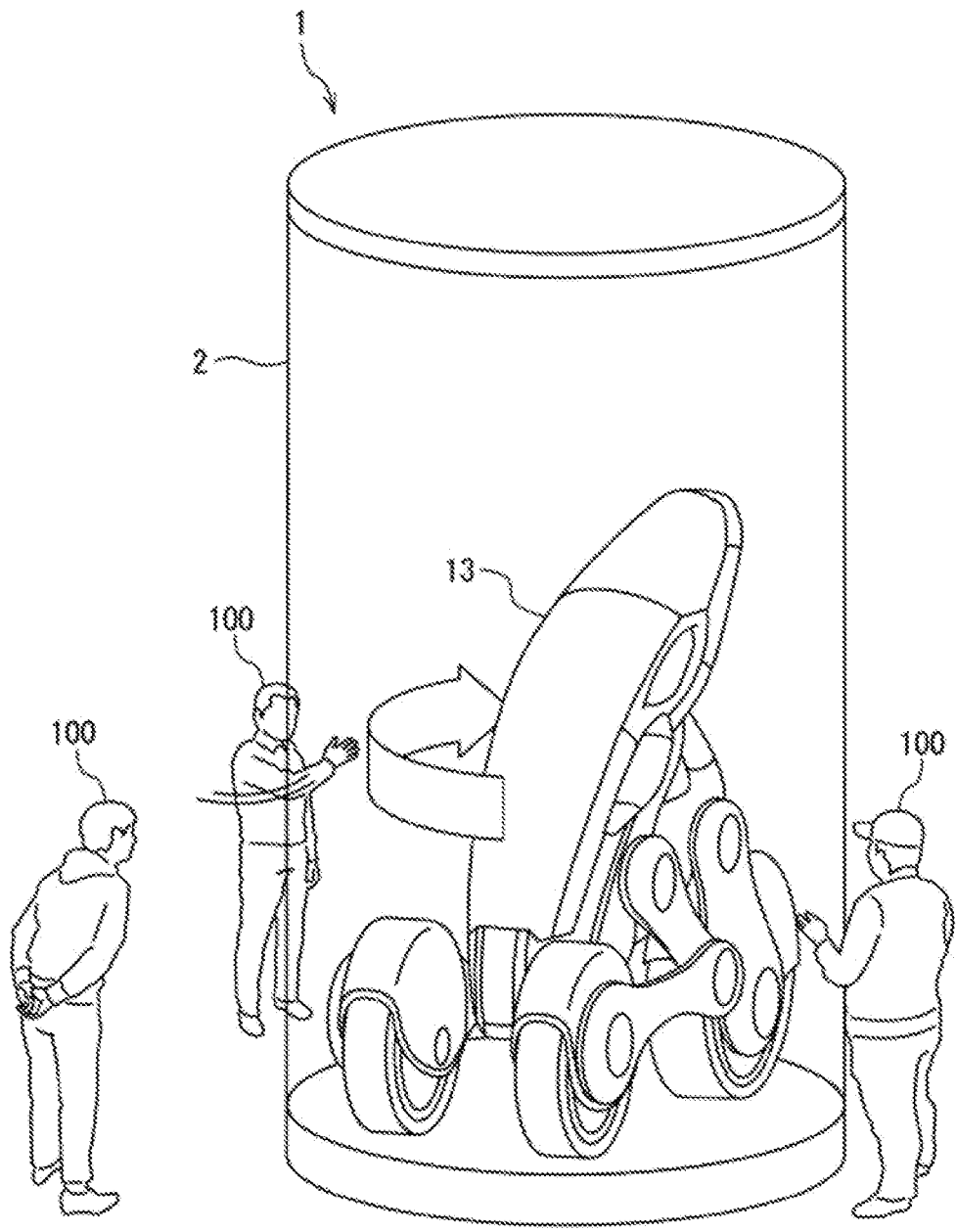
FIG. 21 illustrates an operation of an image processing apparatus according to a second modification example.

In addition, in the image display apparatus 1 according to each of the first to fifth embodiments of the present disclosure, the example has been given in which the image display apparatus 1 is small enough to be lifted by a user with one hand, but other configurations may also be employed. For example, as illustrated in FIG. 21, the image display apparatus 1 may be sized to be large enough to be about the height of a person.

Figure 22:
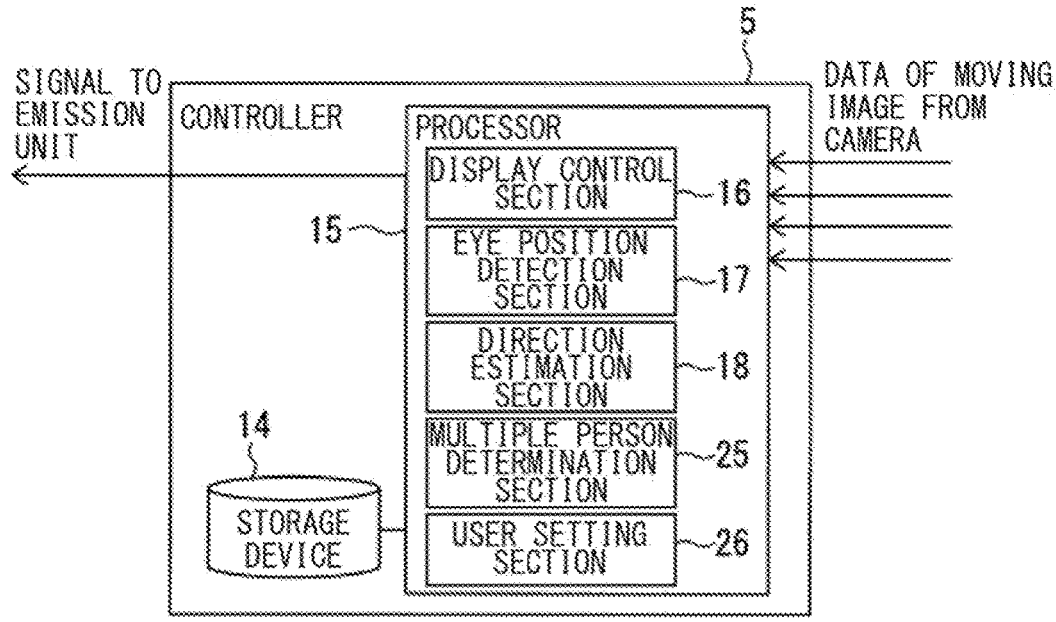
FIG. 22 illustrates an internal configuration of a controller.
Figure 23:
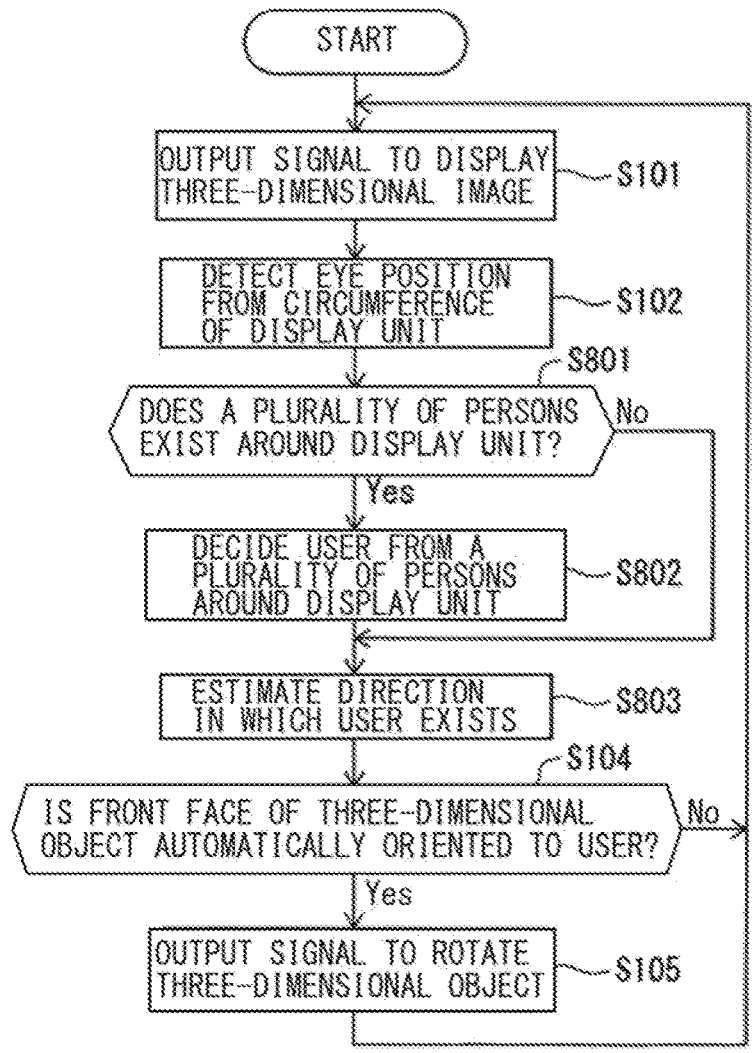
FIG. 23 is a flowchart illustrating processing contents of control processing.

In a case where the image display apparatus 1 is sized to be large, a configuration may be adopted in which determination is made as to whether a plurality of persons exists around the display unit 2 to decide, from the plurality of persons, a user of the image display apparatus 1, i.e., a person to whom the front face of the three-dimensional object 13 represented by the three-dimensional image is oriented. In a case of applying such a configuration to the first embodiment, for example, as illustrated in FIG. 22, a configuration may be adopted in which the processor 15 implements a multiple person determination section 25 and a user setting section 26, in addition to the display control section 16, the eye position detection section 17, and the direction estimation section 18, in accordance with the control programs stored in the storage device 14. In addition, as illustrated in FIG. 23, a configuration may be adopted in which steps S801, S802, and S803 are be provided instead of step S103 of the control processing illustrated in FIG. 5.

In step S801, the multiple person determination section 25 determines whether a plurality of persons exists around the display unit 2. Specifically, determination is made in step S102 as to whether eyes of a plurality of persons have been detected. Then, in a case where determination is made that eyes of a plurality of persons have been detected, determination is made that a plurality of persons exists around the display unit 2 (Yes), and the processing proceeds to step S802. Meanwhile, in a case where determination is made that eyes of only one person have been detected, determination is made that there is only one person around the display unit 2 (No), and the processing proceeds to step S803.

In step S802, the user setting section 26 judges a user with the highest degree of interest to the three-dimensional object 13 among the plurality of persons who exists around the display unit 2 to be the user of which the direction is detected in step S803, i.e., the user to whom the front face of the three-dimensional object 13 is oriented, and then the processing proceeds to step S803. As the method for detecting the person with the highest degree of interest to the three-dimensional object 13, for example, there may be employed a method of detecting a person viewing the three-dimensional object 13 for the longest time among the plurality of persons to judge the detected person to be the person with the highest degree of interest. As the time during which the three-dimensional object 13 is viewed, for example, there may be employed successive periods of time during which the eye position is detected in step S102. That is, even a person who has successively been viewing the three-dimensional object 13 for a long period of time until immediately before but is currently turning eyes away from the three-dimensional object 13 is not detected as a person who is viewing the three-dimensional object 13 for the longest time.

In step S803, the direction estimation section 18 estimates a direction in which the user exists as seen from the display unit 2. Specifically, the direction in which the eye position is detected in step S102 is outputted as a result of the estimation of the direction in which the user exists. It is to be noted that, in a case where the determination in step S801 is "Yes" and the user is decided from among the plurality of persons in step S802, the direction in which the eye position of the person decided to be the user is detected is outputted as a result of the estimation of the direction in which the user exists.

In this manner, in the image display apparatus 1 according to the present modification example, in a case where determination is made as to whether the eyes of a plurality of persons are detected by the eye position detection section 17 to determine that the eyes of the plurality of persons are detected, the person with the highest degree of interest to the three-dimensional object 13 among the plurality of persons is judged to be the user. Therefore, when a plurality of persons is viewing the three-dimensional object 13, the front face of the three-dimensional object 13 is able to be oriented to the person with the highest degree of interest to the three-dimensional object 13.

In addition, in the image display apparatus 1 according to the present modification example, a person who is viewing the three-dimensional object 13 for the longest time among the plurality of persons who exists around the display unit 2 is detected to judge the detected person to be the person with the highest degree of interest. Therefore, when a plurality of persons is viewing the three-dimensional object 13, the front face of the three-dimensional object 13 is able to be oriented to the person who has been viewing the three-dimensional object 13 for the longest time. In addition, in a case where the front face of the three-dimensional object 13 is oriented to a certain person but the person turns to another direction or leaves that place, the front face of the three-dimensional object 13 is able to be oriented to another person who is viewing the three-dimensional object 13 for the longest at that point in time.

It is to be noted that the example is given where the configuration of the above modification example, i.e., the configuration in which determination is made as to whether a plurality of persons surrounds the display unit 2 to decide the user of the image display apparatus 1 from among the plurality of persons is applied to the first embodiment; however, for example, the configuration may also be applied to the second, third, and fifth embodiments.

Figure 24:
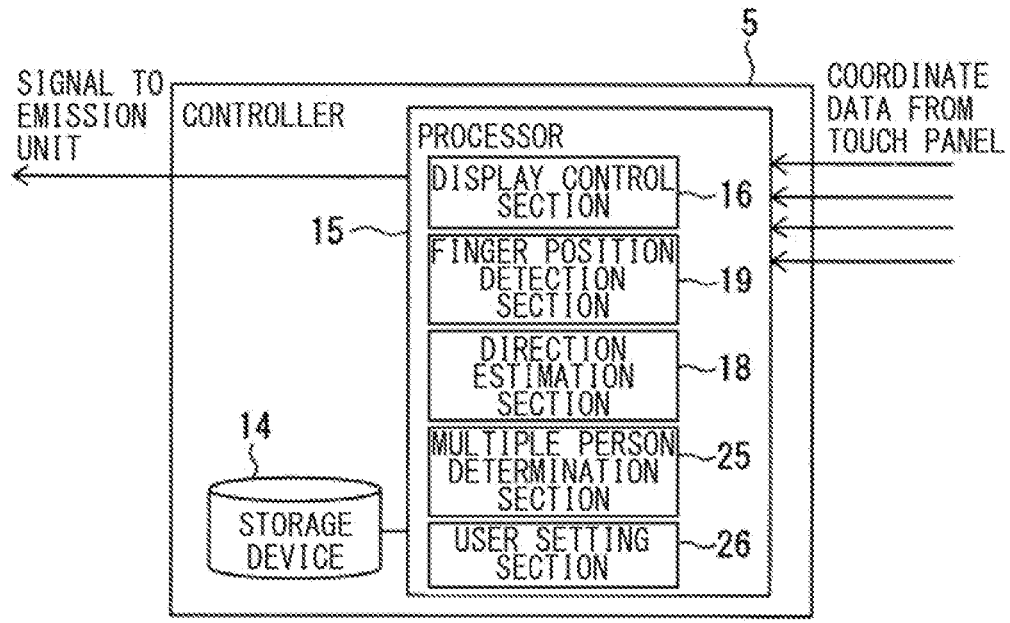
FIG. 24 illustrates an internal configuration of a controller.
Figure 25:
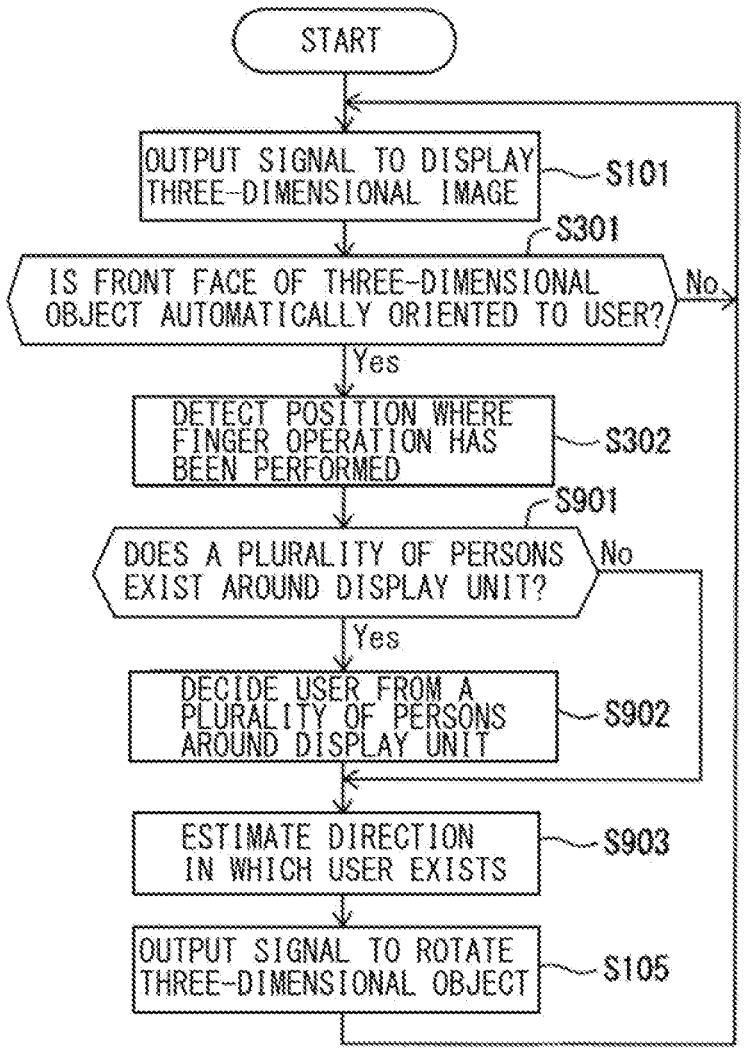
FIG. 25 is a flowchart illustrating processing contents of control processing.

In a case of applying to the third embodiment, for example, as illustrated in FIG. 24, a configuration may be adopted in which the processor 15 implements the multiple person determination section 25 and the user setting section 26, in addition to the display control section 16, the finger position detection section 19, and the direction estimation section 18, in accordance with the control programs stored in the storage device 14. In addition, as illustrated in FIG. 25, a configuration may be adopted in which steps S901, S902, and S903 are provided instead of step S303 of the control processing illustrated in FIG. 9.

In step S901, the multiple person determination section 25 determines whether a plurality of persons is performing the flick operation on the touch panel 3. Specifically, first, a detection result (information on coordinates of the contact position of a finger or the like) outputted from the touch panel 3 is acquired. Subsequently, on the basis of the acquired detection result, determination is made as to whether the flick operation has been detected at a plurality of locations on the touch panel 3. Then, in a case where determination is made that the flick operation has been detected at a plurality of locations, determination is made that a plurality of persons is performing the flick operation on the touch panel 3 (Yes), and the processing proceeds to step S902. Meanwhile, in a case where determination is made that the flick operation has been detected only at one location, determination is made that there is only one person who is performing the flick operation on the touch panel 3 (No), and the processing proceeds to step S903.

In step S902, the user setting section 26 judges a person with the highest degree of interest to the three-dimensional object 13 among the plurality of persons who is performing the flick operation on the touch panel 3 to be the user of which the direction is detected in step S903, i.e., the user to whom the front face of the three-dimensional object 13 is oriented, and then the processing proceeds to step S903. As the method for detecting the person with the highest degree of interest to the three-dimensional object 13, for example, there may be employed a method of detecting a person having the fastest flick operation speed among the plurality of persons to judge the detected person to be the person with the highest degree of interest. As the flick operation speed, for example, there may be employed acceleration and speed of a finger.

In step S903, the direction estimation section 18 estimates a direction in which the user exists as seen from the display unit 2. Specifically, the normal direction at the position on the touch panel 3 detected in step S302 is outputted as a result of the estimation of the direction in which the user exists. It is to be noted that, in a case where the determination in step S901 is "Yes" and the user is decided from among the plurality of persons in step S902, a normal direction at a position on the touch panel 3 with which a person decided to be the user has been in contact is outputted as a result of the estimation of the direction in which the user exists.

In this manner, in the image display apparatus 1 according to the present modification example, in a case where determination is made as to whether a plurality of persons is performing the flick operation to determine that the plurality of persons is performing the flick operation, the person with the highest degree of interest to the three-dimensional object 13 among the plurality of persons is judged to be the user. Therefore, when the plurality of persons is trying to orient the three-dimensional object 13 to sides of themselves, the front face of the three-dimensional object 13 is able to be oriented to the person with the highest degree of interest to the three-dimensional object 13.

In addition, in the image display apparatus 1 according to the present modification example, a person having the fastest flick operation speed is detected to judge the detected person to be the person with the highest degree of interest. Therefore, when a plurality of persons is orienting the three-dimensional object 13 to the sides of themselves, the front face of the three-dimensional object 13 is able to be oriented to the person having the fastest flick operation speed.

Figure 26:
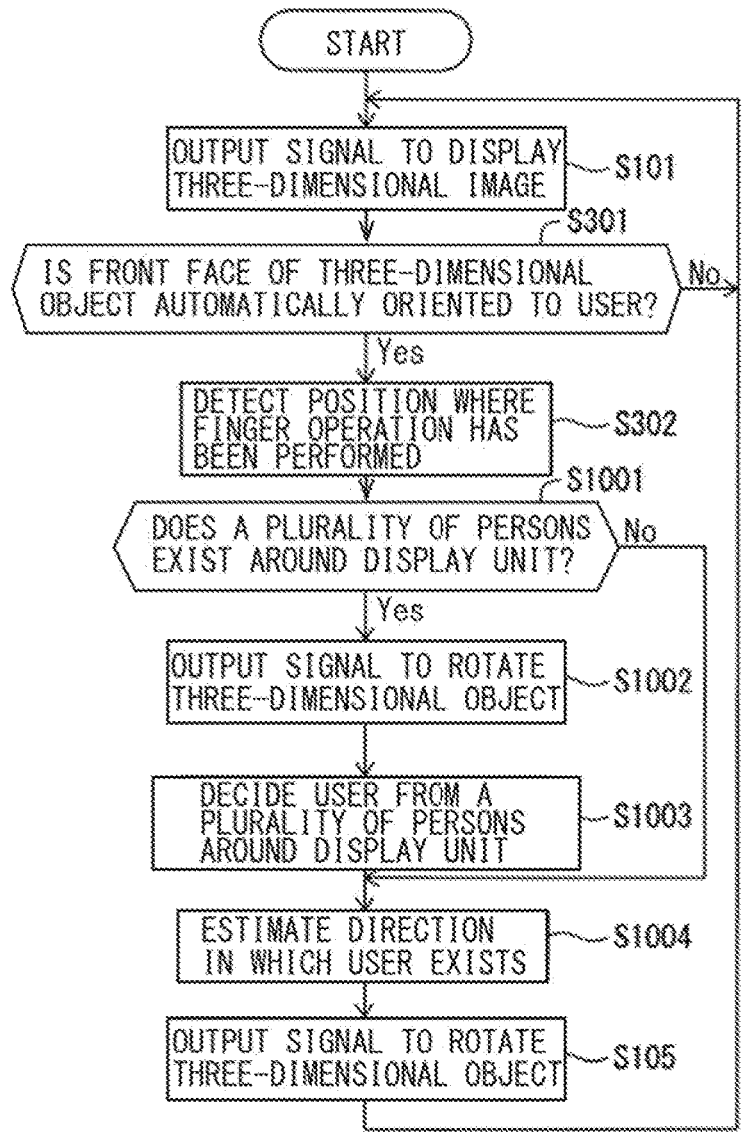
FIG. 26 is a flowchart illustrating processing contents of control processing.

In addition, as another configuration to be applied to the third embodiment, for example, the configuration illustrated in FIG. 24 may be implemented, and a configuration may also be adopted in which steps S1001, S1002, and S1003 are provided instead of step S303 of the control processing illustrated in FIG. 9, as illustrated in FIG. 26.

In step S1001, the multiple person determination section 25 determines whether a plurality of persons is performing the flick operation on the touch panel 3 by following a procedure similar to that in step S901 described above. Then, in a case where determination is made that the plurality of persons is performing the flick operation on the touch panel 3 (Yes), the processing proceeds to step S1002. Meanwhile, in a case where determination is made that there is only one person who is performing the flick operation on the touch panel 3 (No), the processing proceeds to step S1004.

In step S1002, the display control section 16 rotates the three-dimensional object 13 at a speed corresponding to the sum of the flick operation speeds of the respective persons who are performing the flick operations on the touch panel 3. Specifically, first, on the basis of the detection result (information on coordinates of the contact position of a finger or the like) acquired from the touch panel 3, the speed of the flick operation performed in each of the plurality of locations on the touch panel 3 is detected. As for the flick operation speed, for example, a clockwise operation is set as a positive value, and a counterclockwise operation is set as a negative value, in a plan view. Subsequently, the detected speeds are summed up to sequentially create image data of three-dimensional images to rotate the three-dimensional object 13 at a speed corresponding to the sum. At that time, in a case where the flick operation is stopped during the rotation of the three-dimensional object 13, image data of three-dimensional images to gradually damp the rotation of the three-dimensional object 13 is sequentially created. In addition, in a case where determination is made that there has been a simple touch operation in which a finger is not moved to right and left during the rotation of the three-dimensional object 13, image data of three-dimensional images to brake the rotation of the three-dimensional object 13 is sequentially created.

In addition, at the same time, the created image data is sequentially converted into data of the image light 11 to sequentially output, to the emission unit 10, a signal to irradiate the image light 11 indicated by the data obtained by the conversion. Such a flow of the creation of the image data of the three-dimensional image→the conversion into the data of the image light 11→the output of the signal to the emission unit 10 is repeated until the rotation of the three-dimensional object 13 by the flick operation is stopped. When the rotation of the three-dimensional object 13 is stopped, the processing proceeds to step S1003.

In step S1003, the user setting section 26 sets the person closest to the front face of the three-dimensional object 13 among the plurality of persons who is performing the flick operation on the touch panel 3 as the user of which the direction is detected in step S1004, i.e., as the user to whom the front face of the three-dimensional object 13 is oriented, and then the processing proceeds to step S1004. As the method for detecting the person closest to the front face of the three-dimensional object 13, for example, there may be employed a method of detecting a person having the narrowest angle, in a plan view, formed between a straight line extending in a direction from the optical axis 9 to the front face of the three-dimensional object 13 and a straight line extending from the optical axis 9 to the person who is performing the flick operation.

In step S1004, the direction estimation section 18 estimates a direction in which the user exists as seen from the display unit 2. Specifically, the normal direction at a position on the touch panel 3 detected in step S302 is outputted as a result of the estimation of the direction in which the user exists. It is to be noted that, in a case where the determination in step S1001 is "Yes" and the user is decided from among the plurality of persons in step S1003, the normal direction at the position on the touch panel 3 with which a person decided to be the user has been in contact is outputted as a result of the estimation of the direction in which the user exists.

In this manner, in the image display apparatus 1 according to the present modification example, in a case where determination is made that a plurality of persons is performing the flick operation on the touch panel 3, the three-dimensional object 13 is rotated at a speed corresponding to the sum of the speeds of the flick operations of the respective persons. Then, when the rotation of the three-dimensional object 13 by the flick operation is stopped, the person closest to the front face of the three-dimensional object 13 among the plurality of persons is set as the user. Here, for example, in a case where one person A performs the flick operation on the touch panel 3 to thereby rotate the three-dimensional object 13 and stops the rotation when the front face of the three-dimensional object 13 is oriented to a direction in which another person B exists, the one person A is able to orient the front face of the three-dimensional object 13 to the other person B only by stopping the rotation of the three-dimensional object 13 at an approximate position, thus making it possible to perform the operation relatively easily.

Figure 27:
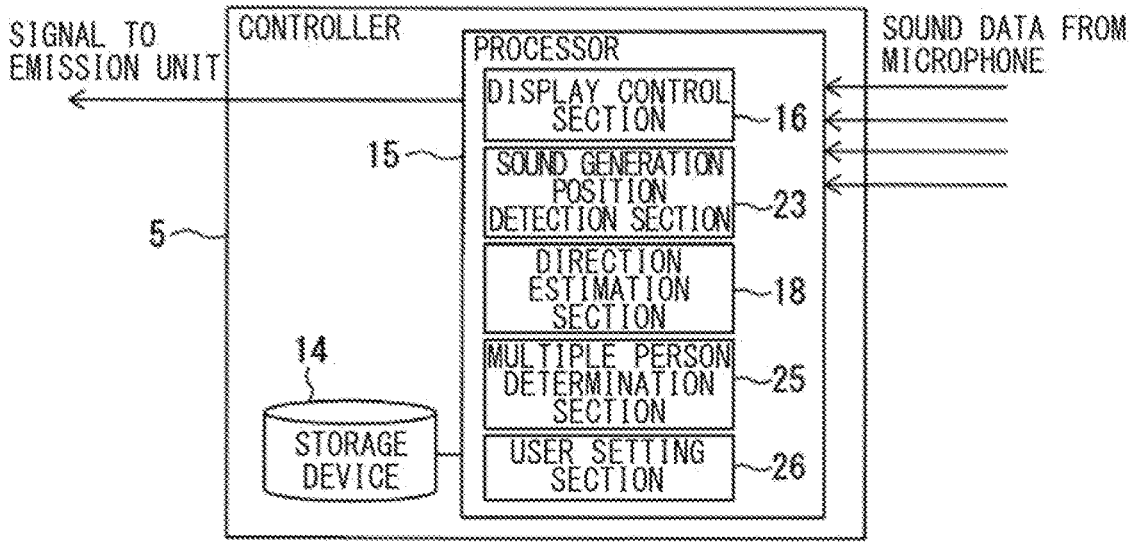
FIG. 27 illustrates an internal configuration of a controller.

In a case of applying to the fifth embodiment, for example, as illustrated in FIG. 27, a configuration may be adopted in which the processor 15 implements the multiple person determination section 25 and the user setting section 26, in addition to the display control section 16, the sound generation position detection section 23, and the direction estimation section 18, in accordance with the control programs stored in the storage device 14. In addition, as illustrated in FIG. 28, a configuration may be adopted in which steps S1101, S1102, and S1103 are provided instead of step S502 of the control processing illustrated in FIG. 15.

In step S1101, the multiple person determination section 25 determines whether a plurality of persons exists around the display unit 2. Specifically, determination is made in step S501 as to whether sounds of a plurality of persons have been acquired. Then, in a case where determination is made that sounds of a plurality of persons have been acquired, determination is made that a plurality of persons exists around the display unit 2 (Yes), and the processing proceeds to step S1102. Meanwhile, in a case where determination is made that a sound of only one person has been acquired, determination is made that there is only one person around the display unit 2 (No), and the processing proceeds to step S1103.

In step S1102, the user setting section 26 judges a person with the highest degree of interest to the three-dimensional object 13 among the plurality of persons who exists around the display unit 2 to be the user of which the direction is detected in step S1103, i.e., the user to whom the front face of the three-dimensional object 13 is oriented, and then the processing proceeds to step S1103. As the method for detecting the person with the highest degree of interest to the three-dimensional object 13, for example, there may be employed a method of detecting a person who generates a pre-registered sound for the longest time to judge the detected person to be the person with the highest degree of interest. As the time during which the pre-registered sound is generated, for example, there may be employed successive periods of time during which the sound is detected in step S501. In addition, as another method for detecting a person with the highest degree of interest, for example, there may be employed a method of detecting a person who last generated the pre-registered sound to judge the detected person to be the person with the highest degree of interest.

In step S1103, the direction estimation section 18 estimates a direction in which the user exists as seen from the display unit 2. Specifically, the direction in which the sound generation position is detected in step S501 is outputted as a result of the estimation of the direction in which the user exists. It is to be noted that, in a case where the determination in step S1101 is "Yes" and the user is decided from among the plurality of persons in step S1102, the direction in which the generation position of the sound being generated by the person decided to be the user is detected is outputted as a result of the estimation of the direction in which the user exists.

In this manner, in the image display apparatus 1 according to the present modification example, in a case where determination is made as to whether the sounds of the plurality of persons have been acquired by the microphone 22 to determine that the sounds of the plurality of persons have been acquired, the person with the highest degree of interest to the three-dimensional object 13 among the plurality of persons is judged to be the user. Therefore, for example, when the plurality of persons is making a call or the like to the three-dimensional object 13, the front face of the three-dimensional object 13 is able to be oriented to the person with the highest degree of interest to the three-dimensional object 13.

In addition, in the image display apparatus 1 according to the present modification example, a person who is generating the pre-registered sound for the longest time among the plurality of persons is judged to be the person with the highest degree of interest. Therefore, for example, when the plurality of persons is making call to the three-dimensional object 13, the front face of the three-dimensional object 13 is able to be oriented to the person who is making the call for the longest time.

In addition, in the image display apparatus 1 according to the present modification example, a person who last generated the pre-registered sound is detected among the plurality of persons, and the detected person is judged to be the person with the highest degree of interest. Therefore, for example, in a case where one person A has made a call or the like to the three-dimensional object 13 to orient the front face of the three-dimensional object 13 to the one person A but stops the calling, the front face of the three-dimensional object 13 is able to be oriented to another person B who is making a call to the three-dimensional object 13 at that point in time.

[6-3 Third Modification Example]

In addition, in the image display apparatus 1 according to each of the first to fifth embodiments of the present disclosure, the example has been given in which the front face of the three-dimensional object 13 is automatically oriented to the user, but other configurations may also be adopted. For example, as illustrated in FIG. 29, a configuration may also be adopted in which, after the front face of the three-dimensional object 13 is automatically oriented to the user, the front face of the three-dimensional object 13 is rotated in a predetermined direction in accordance with a word uttered from the user. In a case where such a configuration is applied to the fifth embodiment, for example, as illustrated in FIG. 29, a configuration may also be adopted in which step S1201 is provided after step S105 of the control processing illustrated in FIG. 15.

In step S1201, the display control section 16 determines whether a word to orient the front face of the three-dimensional object 13 in a predetermined direction (hereinafter, also referred to as "direction indication") is included in the sound generated by the user. As the direction indication, for example, there may be employed "turn to left" or "turn to right". Specifically, first, data of sound outputted from each of the plurality of microphones 22 is acquired. Subsequently, determination is made as to whether the sound indicated by the acquired data includes the direction indication.

Then, in a case where the display control section 16 determines that the sound acquired from each of the plurality of microphones 22 includes no direction indication, the processing returns to step S101. Meanwhile, in a case where determination is made that the acquired sound includes a direction indication, first, image data of a three-dimensional image to rotate the three-dimensional object 13 is sequentially created to orient the front face of the three-dimensional object 13 displayed by the display unit 2 in a direction (a left direction or a right direction) indicated by the direction indication as viewed from the user. In addition, at the same time, the created image data is sequentially converted into data of the image light 11 to sequentially output, to the emission unit 10, a signal to irradiate the image light 11 indicated by the data obtained by the conversion. Such a flow of the creation of the image data of the three-dimensional image→the conversion into the data of the image light 11→the output of the signal to the emission unit 10 is repeated until the front face of the three-dimensional object 13 is oriented to the direction indicated by the direction indication to stop the rotation; when the rotation of the three-dimensional object 13 is stopped, the processing proceeds to step S101.

In this manner, in the image display apparatus 1 according to the present modification example, after the front face of the three-dimensional object 13 is oriented to the user, determination is made as to whether a word (direction indication) to orient the front face of the three-dimensional object 13 in a predetermined direction is included in the sound generated by the user to determine that such a word (direction indication) is included, the front face of the three-dimensional object 13 displayed by the display unit 2 is oriented in the predetermined direction as viewed from the user. Therefore, for example, when a plurality of persons is viewing the three-dimensional object 13, communication of a direction of the other person B by the one person A enables the front face of the three-dimensional object 13 to be oriented to the other person B.

It is to be noted that the present modification example has given the example of using the word directly indicating a direction, such as "turn to left" or "turn to right", as the direction indication to orient the front face of the three-dimensional object 13 in a predetermined direction; however, other configurations may also be employed. For example, a word indicating a name of a person such as "turn to B" may be used. A configuration may be adopted in which, in a case of using the word indicating a name of a person, the name and a facial image of the person are pre-registered; in a case where determination is made that the name of the person is included in a voice uttered by the user, a position of the person of the name is detected on the basis of an imaging result acquired from the camera 4 and the pre-registered facial image to orient the front face of the three-dimensional object 13 in a direction of the detected position.

[6-4 Other Modification Examples]

(1) In addition, in the image display apparatus 1 according to each of the first to fifth embodiments, the example has been given in which the controller 5 is disposed inside the base 6, and the controller 5 is integrated with the display unit 2; however, other configurations may also be employed. For example, the controller 5 may be disposed outside the display unit 2 to separate the controller 5 from the display unit 2. In a case where the controller 5 is separated from the display unit 2, the controller 5 may be sized to be larger to enable a complicated three-dimensional image to be displayed.

(2) In addition, in the image display apparatus 1 according to each of the first to fifth embodiments, the example has been given in which the cylindrical screen 7 is irradiated with the image light 11 to display the three-dimensional image; however, other configurations may also be employed. For example, a configuration may also be adopted where a three-dimensional image is displayed by using a device in which a liquid crystal display is disposed on each surface of a cube.

(3) In addition, in the image display apparatus 1 according to each of the first to fifth embodiments, the example has been given in which the display unit 2 that enables the three-dimensional image to be visually recognized from 360° around the display unit 2 is used; however, other configurations may also be employed. For example, a configuration may also be adopted to use the display unit 2 in which an angular range enabling the three-dimensional image to be visually recognized is narrower than 360°.

(4) In addition, a configuration may also be adopted in which, in a case where various actions (calling, gesture, line of sight) are performed by a plurality of persons to demand the front face of the three-dimensional object 13 to be oriented thereto as described in each of the first to fifth embodiments, a user who performed an action of the highest priority is decided to be the user to orient the front face of the three-dimensional object 13 represented by the three-dimensional image in a direction in which the decided user exists. The priority is, for example, in the order of a person who called the name of the image display apparatus 1 or the name of the three-dimensional object→a person who made a finger gesture >a person who simply viewed. It is to be noted that the present technology may have the following configurations.

(1)
An image display apparatus including:
a display unit that displays a three-dimensional image, by which a three-dimensional object appears to exist in a space partitioned by members configuring an outer surface, to be visually recognizable from a plurality of circumferential directions;
a direction estimation section that estimates a direction in which a user exists as seen from the display unit; and
a display control section that orients a front face of the three-dimensional object displayed by the display unit in the direction in which the user exists estimated by the direction estimation section.

(2)
The image display apparatus according to (1), including an eye position detection section that detects an eye position of a person who exists around the display unit, in which the direction estimation section outputs a direction in which the eye position is detected, as a result of the estimation of the direction in which the user exists.

(3)
The image display apparatus according to (2), including a camera that shoots a circumference of the display unit, in which the eye position detection section detects the eye position on a basis of a result of the shooting of the circumference of the display unit.

(4)
The image display apparatus according to (3), including a ranging sensor that measures distances to a plurality of points on a surface of a body around the display unit, in which the eye position detection section detects the eye position on a basis of a result of the measurement of the distances.

(5)
The image display apparatus according to any one of (2) to (4), including:
a multiple person determination section that determines whether the eye position detection section has detected eyes of a plurality of persons; and a user setting section that judges, in a case where determination is made that the eyes of the plurality of persons have been detected, a person with a highest degree of interest to the three-dimensional object among the plurality of persons to be the user.

(6)

The image display apparatus according to (5), in which the user setting section detects a person who is viewing the three-dimensional object for longest time among the plurality of persons to judge the detected person to be the person with the highest degree of interest.

(7)

The image display apparatus according to (1), including a finger position detection section that detects a finger position of a person who exists around the display unit, in which the direction estimation section outputs a direction in which the finger position is detected, as a result of the estimation of the direction in which the user exists.

(8)

The image display apparatus according to (7), including a camera that shoots a circumference of the display unit, in which the finger position detection section detects the finger position on a basis of a result of the shooting of the circumference of the display unit.

(9)

The image display apparatus according to (7), including a ranging sensor that measures distances to a plurality of points on a surface of a body around the display unit, in which the finger position detection section detects the finger position on a basis of a result of the measurement of the distances.

(10)

The image display apparatus according to (1), including:
a grip determination section that determines whether the display unit is gripped; and
a grip position detection section that detects a position of fingers gripping the display unit in a case where determination is made that the display unit is gripped, in which
the direction estimation section estimates the direction in which the user exists on a basis of a result of the detection of the position of the fingers gripping the display unit.

(11)

The image display apparatus according to (10), including a touch panel provided on the outer surface of the display unit, in which
the grip position detection section detects the position of the fingers gripping the display unit on a basis of a result of detection on the touch panel.

(12)

The image display apparatus according to (1), including a touch panel provided on the outer surface of the display unit, in which
the direction estimation section detects a position, of the touch panel, where a finger operation has been performed, and outputs a normal direction at the detected position as a result of the estimation of the direction in which the user exists.

(13)

The image display apparatus according to (1), including a sound generation position detection section that detects a generation position of a sound generated around the display unit, in which the direction estimation section outputs a direction in which the generation position of the sound is detected, as a result of the estimation of the direction in which the user exists.

(14)

The image display apparatus according to (13), including a microphone that acquires a sound around the display unit, in which
the sound generation position detection section detects the generation position of the sound on a basis of a result of the acquisition of the sound.

(15)

The image display apparatus according to (14), in which
the display control section determines whether the sound acquired by the microphone includes a pre-registered sound, and
the display control section orients, in a case where determination is made that the pre-registered sound is included, the front face of the three-dimensional object displayed by the display unit in the direction in which the user exists estimated by the direction estimation section.

(16)

The image display apparatus according to (15), including:
a multiple person determination section that determines whether sounds of a plurality of persons have been acquired by the microphone; and
a user setting section that judges, in a case where determination is made that the sounds of the plurality of persons have been acquired, a person with a highest degree of interest to the three-dimensional object among the plurality of persons to be the user.

(17)

The image display apparatus according to (16), in which the user setting section detects a person who is uttering the pre-registered sound for longest time among the plurality of persons to judge the detected person to be the person with the highest degree of interest.

(18)

The image display apparatus according to (16), in which the user setting section detects a person who last uttered the pre-registered sound among the plurality of persons to judge the detected person to be the person with the highest degree of interest.

(19)

The image display apparatus according to any one of (13) to (18), in which
the display control section determines, after the front face of the three-dimensional object is oriented to the user, whether a word to orient the front face of the three-dimensional object in a predetermined direction is included in a sound uttered by the user, and
the display control section orients, in a case where determination is made that the word is included, the front face of the three-dimensional object displayed by the display unit in the predetermined direction as viewed from the user.

(20)

The image display apparatus according to any one of (1) to (19), in which the display control section causes the display unit to change an orientation of the front face of the three-dimensional object by rotating the three-dimensional object.

(21)

The image display apparatus according to (20), in which the display control section decides a rotational direction of the three-dimensional object to allow a rotational amount of the three-dimensional object to be minimum.

(22)

The image display apparatus according to (1), including:
a touch panel provided on the outer surface of the display unit;
a multiple person determination section that determines whether a plurality of persons is performing a flick operation on the touch panel; and
a user setting section that judges, in a case where determination is made that the plurality of persons is performing the flick operation, a person with a highest degree of interest to the three-dimensional object among the plurality of persons to be the user.

(23)

The image display apparatus according to (22), in which the user setting section detects a person having a fastest speed of the flick operation among the plurality of persons to judge the detected person to be the person with the highest degree of interest.

(24)

The image display apparatus according to (1), including a touch panel provided on the outer surface of the display unit, in which
the display control section rotates, in a case where a plurality of persons are performing flick operations on the touch panel, the three-dimensional object at a speed corresponding to a sum of speeds of the flick operations of the respective persons, and
the image display apparatus further includes a user setting section that sets, as the user, a person closest to the front face of the three-dimensional object among the plurality of persons, when the rotation of the three-dimensional object by the flick operations is stopped.

(25)

An image display apparatus including:
a display unit that displays a three-dimensional image, by which a three-dimensional object appears to exist in a space partitioned by members configuring an outer surface, to be visually recognizable from a plurality of circumferential directions;
a touch panel provided on the outer surface of the display unit; and
a display control section that rotates, in a case where a flick operation is performed on the touch panel, the three-dimensional object displayed by the display unit in an orientation of the flick operation.

REFERENCE NUMERALS LIST 1 image display apparatus
2 display unit
3 touch panel
4 camera
5 controller
6 base
7 screen
8 reflective mirror
9 optical axis
10 emission unit
11 image light
12 space
13 three-dimensional object
14 storage device
15 processor
16 display control section
17 eye position detection section
18 direction estimation section
19 finger position detection section
20 grip determination section
21 grip position detection section
22 microphone
23 sound generation position detection section
24 ranging sensor
25 multiple person determination section
26 user setting section
100 user

What is claimed is:

1. An image display apparatus, comprising:
a display unit that displays a three-dimensional image, by which a three-dimensional object appears to exist in a space partitioned by members configuring an outer surface, to be visually recognizable from a plurality of circumferential directions;
a direction estimation section that estimates a direction in which a user exists as seen from the display unit; and
a display control section that orients a front face of the three-dimensional object displayed by the display unit in the direction in which the user exists estimated by the direction estimation section.

2. The image display apparatus according to claim 1, comprising an eye position detection section that detects an eye position of a person who exists around the display unit, wherein
the direction estimation section outputs a direction in which the eye position is detected, as a result of the estimation of the direction in which the user exists.

3. The image display apparatus according to claim 2, comprising a camera that shoots a circumference of the display unit, wherein
the eye position detection section detects the eye position on a basis of a result of the shooting of the circumference of the display unit.

4. The image display apparatus according to claim 2, comprising a ranging sensor that measures distances to a plurality of points on a surface of a body around the display unit, wherein
the eye position detection section detects the eye position on a basis of a result of the measurement of the distances.

5. The image display apparatus according to claim 2, comprising:
a multiple person determination section that determines whether the eye position detection section has detected eyes of a plurality of persons; and
a user setting section that judges, in a case where determination is made that the eyes of the plurality of persons have been detected, a person with a highest degree of interest to the three-dimensional object among the plurality of persons to be the user.

6. The image display apparatus according to claim 5, wherein the user setting section detects a person who is viewing the three-dimensional object for longest time among the plurality of persons to judge the detected person to be the person with the highest degree of interest.

7. The image display apparatus according to claim 1, comprising a finger position detection section that detects a finger position of a person who exists around the display unit, wherein
the direction estimation section outputs a direction in which the finger position is detected, as a result of the estimation of the direction in which the user exists.

8. The image display apparatus according to claim 7, comprising a camera that shoots a circumference of the display unit, wherein
the finger position detection section detects the finger position on a basis of a result of the shooting of the circumference of the display unit.

9. The image display apparatus according to claim 7, comprising a ranging sensor that measures distances to a plurality of points on a surface of a body around the display unit, wherein
the finger position detection section detects the finger position on a basis of a result of the measurement of the distances.

10. The image display apparatus according to claim 1, comprising:
a grip determination section that determines whether the display unit is gripped; and
a grip position detection section that detects a position of fingers gripping the display unit in a case where determination is made that the display unit is gripped, wherein
the direction estimation section estimates the direction in which the user exists on a basis of a result of the detection of the position of the fingers gripping the display unit.

11. The image display apparatus according to claim 10, comprising a touch panel provided on the outer surface of the display unit, wherein
the grip position detection section detects the position of the fingers gripping the display unit on a basis of a result of detection on the touch panel.

12. The image display apparatus according to claim 1, comprising a touch panel provided on the outer surface of the display unit, wherein
the direction estimation section detects a position, of the touch panel, where a finger operation has been performed, and outputs a normal direction at the detected position as a result of the estimation of the direction in which the user exists.

13. The image display apparatus according to claim 1, comprising a sound generation position detection section that detects a generation position of a sound generated around the display unit, wherein
the direction estimation section outputs a direction in which the generation position of the sound is detected, as a result of the estimation of the direction in which the user exists.

14. The image display apparatus according to claim 13, comprising a microphone that acquires a sound around the display unit, wherein
the sound generation position detection section detects the generation position of the sound on a basis of a result of the acquisition of the sound.

15. The image display apparatus according to claim 14, wherein
the display control section determines whether the sound acquired by the microphone includes a pre-registered sound, and
the display control section orients, in a case where determination is made that the pre-registered sound is included, the front face of the three-dimensional object displayed by the display unit in the direction in which the user exists estimated by the direction estimation section.

16. The image display apparatus according to claim 15, comprising:
a multiple person determination section that determines whether sounds of a plurality of persons have been acquired by the microphone; and
a user setting section that judges, in a case where determination is made that the sounds of the plurality of persons have been acquired, a person with a highest degree of interest to the three-dimensional object among the plurality of persons to be the user.

17. The image display apparatus according to claim 16, wherein the user setting section detects a person who is uttering the pre-registered sound for longest time among the plurality of persons to judge the detected person to be the person with the highest degree of interest.

18. The image display apparatus according to claim 16, wherein the user setting section detects a person who last uttered the pre-registered sound among the plurality of persons to judge the detected person to be the person with the highest degree of interest.

19. The image display apparatus according to claim 13, wherein
the display control section determines, after the front face of the three-dimensional object is oriented to the user, whether a word to orient the front face of the three-dimensional object in a predetermined direction is included in a sound uttered by the user, and
the display control section orients, in a case where determination is made that the word is included, the front face of the three-dimensional object displayed by the display unit in the predetermined direction as viewed from the user.

20. The image display apparatus according to claim 1, wherein the display control section causes the display unit to change an orientation of the front face of the three-dimensional object by rotating the three-dimensional object.

21. The image display apparatus according to claim 20, wherein the display control section decides a rotational direction of the three-dimensional object to allow a rotational amount of the three-dimensional object to be minimum.

22. The image display apparatus according to claim 1, comprising:
a touch panel provided on the outer surface of the display unit;
a multiple person determination section that determines whether a plurality of persons is performing a flick operation on the touch panel; and
a user setting section that judges, in a case where determination is made that the plurality of persons is performing the flick operation, a person with a highest degree of interest to the three-dimensional object among the plurality of persons to be the user.

23. The image display apparatus according to claim 22, wherein the user setting section detects a person having a fastest speed of the flick operation among the plurality of persons to judge the detected person to be the person with the highest degree of interest.

24. The image display apparatus according to claim 1, comprising a touch panel provided on the outer surface of the display unit, wherein
the display control section rotates, in a case where a plurality of persons are performing flick operations on the touch panel, the three-dimensional object at a speed corresponding to a sum of speeds of the flick operations of the respective persons, and
the image display apparatus further comprises a user setting section that sets, as the user, a person closest to the front face of the three-dimensional object among the plurality of persons, when the rotation of the three-dimensional object by the flick operations is stopped.

25. An image display apparatus, comprising:
a display unit that displays a three-dimensional image, by which a three-dimensional object appears to exist in a space partitioned by members configuring an outer surface, to be visually recognizable from a plurality of circumferential directions;
a touch panel provided on the outer surface of the display unit; and
a display control section that rotates, in a case where a flick operation is performed on the touch panel, the three-dimensional object displayed by the display unit in an orientation of the flick operation.

* * * * *